US010226036B2

(12) United States Patent
Guice et al.

(10) Patent No.: US 10,226,036 B2
(45) Date of Patent: Mar. 12, 2019

(54) METHOD AND APPARATUS FOR CONTROLLING WEEDS WITH SOLAR ENERGY

(76) Inventors: David L. Guice, Brownsboro, AL (US); Remigius Shatas, Huntsville, AL (US); William V. Dent, Jr., Huntsville, AL (US)

(*) Notice: Subject to any disclaimer, the term of this patent is extended or adjusted under 35 U.S.C. 154(b) by 2429 days.

(21) Appl. No.: 12/181,099

(22) Filed: Jul. 28, 2008

(65) Prior Publication Data
US 2009/0114210 A1 May 7, 2009

Related U.S. Application Data

(60) Provisional application No. 60/962,288, filed on Jul. 27, 2007.

(51) Int. Cl.
*A01M 21/04* (2006.01)
*F24S 20/30* (2018.01)
(Continued)

(52) U.S. Cl.
CPC .............. *A01M 21/04* (2013.01); *F24S 20/30* (2018.05); *F24S 23/31* (2018.05); *F24S 30/425* (2018.05);
(Continued)

(58) Field of Classification Search
USPC ....... 126/572, 573, 576, 578, 593, 600, 605, 126/624, 684, 698, 701, 702; 700/245;
(Continued)

(56) References Cited

U.S. PATENT DOCUMENTS 2,382,722 A * 8/1945 Kezer .......................... 126/698
4,066,062 A * 1/1978 Houston ....................... 126/600
(Continued)

OTHER PUBLICATIONS

Johnson, David W. et al, Response of Monocot and Dicot Weed Species to Fresnel Lens Concentrated Solar Radiation, Weed Science, Nov. 1989 pp. 797-801 vol. 37 Issue 6, WSSA, USA.
(Continued)

*Primary Examiner* — Steven B McAllister
*Assistant Examiner* — Desmond C Peyton
(74) *Attorney, Agent, or Firm* — Mark Clodfelter

(57) ABSTRACT

A method and apparatus for controlling weeds using concentrated solar energy is disclosed. Solar energy may be concentrated by Fresnel lens and directed by manual or automated methods at surfaces of weed plants to heat portions thereof causing damage. Shutters or other devices may be used to direct, and control intensity of concentrated, solar energy, such control preferably applied before significant concentration. In some embodiments, solar energy concentration apparatus may be integrated with ground, air, or water vehicles which may use solar photovoltaic cells for electric power for propulsion and other purposes. Vehicles may use global positioning satellite (GPS) receivers or other methods and apparatus, including video cameras, for navigation and selection of areas (e.g., row middles), plants, or portions of plants to be exposed to concentrated solar energy. Air vehicles may use hydrogen gas electrolyzed from water condensed from humid air to replenish hydrogen gas lost from containment vessels.

19 Claims, 7 Drawing Sheets

(51) Int. Cl.
*F24S 90/00* (2018.01)
*F24S 30/425* (2018.01)
*F24S 23/30* (2018.01)

(52) U.S. Cl.
CPC .............. *F24S 90/00* (2018.05); *Y02E 10/43* (2013.01); *Y02E 10/47* (2013.01)

(58) Field of Classification Search
USPC ........................................................ 136/243
See application file for complete search history.

(56) References Cited

U.S. PATENT DOCUMENTS

| | | | | |
|---|---|---|---|---|
| 4,219,008 | A * | 8/1980 | Schultz | 126/592 |
| 4,411,490 | A * | 10/1983 | Daniel | 126/648 |
| 4,511,755 | A * | 4/1985 | Mori | 136/246 |
| 4,655,195 | A * | 4/1987 | Boynton | 126/631 |
| 4,766,884 | A * | 8/1988 | Mori | 126/591 |
| 4,883,340 | A * | 11/1989 | Dominguez | 359/593 |
| 5,071,241 | A * | 12/1991 | Brock | 359/390 |
| 5,130,545 | A * | 7/1992 | Lussier | 250/458.1 |
| 5,524,381 | A * | 6/1996 | Chahroudi | 47/17 |
| 5,974,348 | A * | 10/1999 | Rocks | 701/28 |
| 6,052,647 | A * | 4/2000 | Parkinson et al. | 701/23 |
| 6,199,000 | B1 * | 3/2001 | Keller et al. | 701/50 |
| 6,553,299 | B1 * | 4/2003 | Keller et al. | 701/50 |
| 6,573,512 | B1 * | 6/2003 | Lucia et al. | 250/458.1 |
| 6,671,582 | B1 * | 12/2003 | Hanley | 700/245 |
| 6,795,568 | B1 * | 9/2004 | Christensen et al. | 382/110 |
| 2011/0146662 | A1 * | 6/2011 | Dehlsen et al. | 126/600 |

OTHER PUBLICATIONS

Johnson, David W. et al, Response of Seed of 10 Weed Species to Fresnel-lens-concentrated Solar Radiation, Weed Technology, Jan.-Mar. 1990, pp. 109-114, vol. 4, Issue 1, WSSA, USA.

* cited by examiner

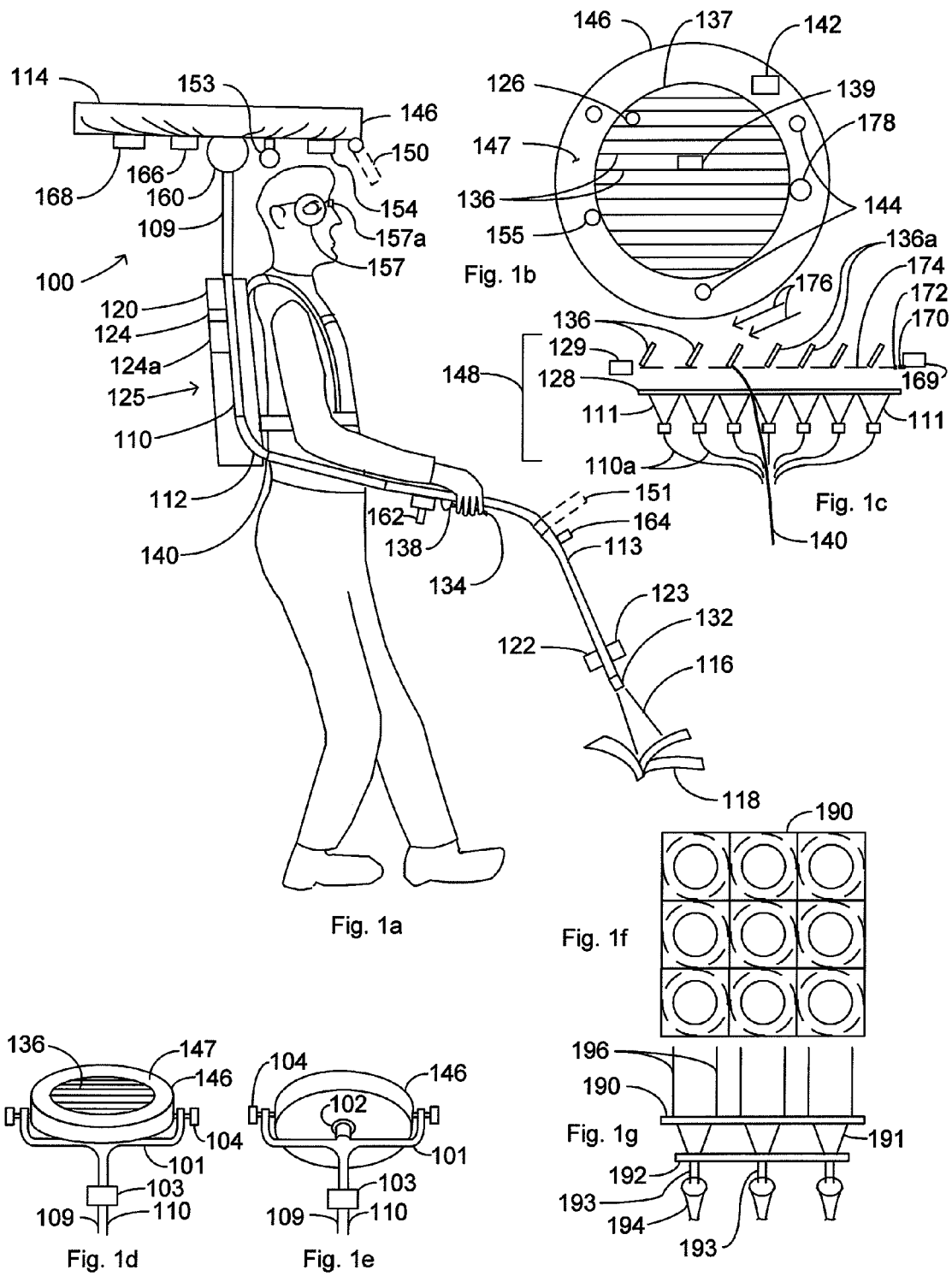

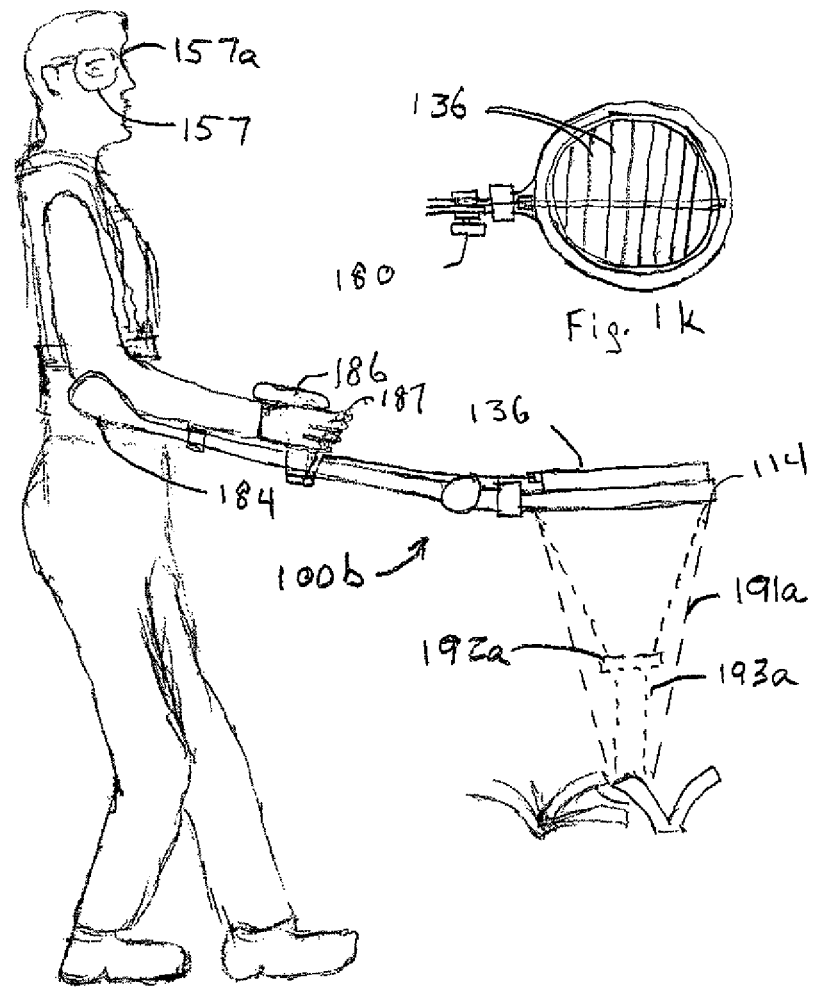

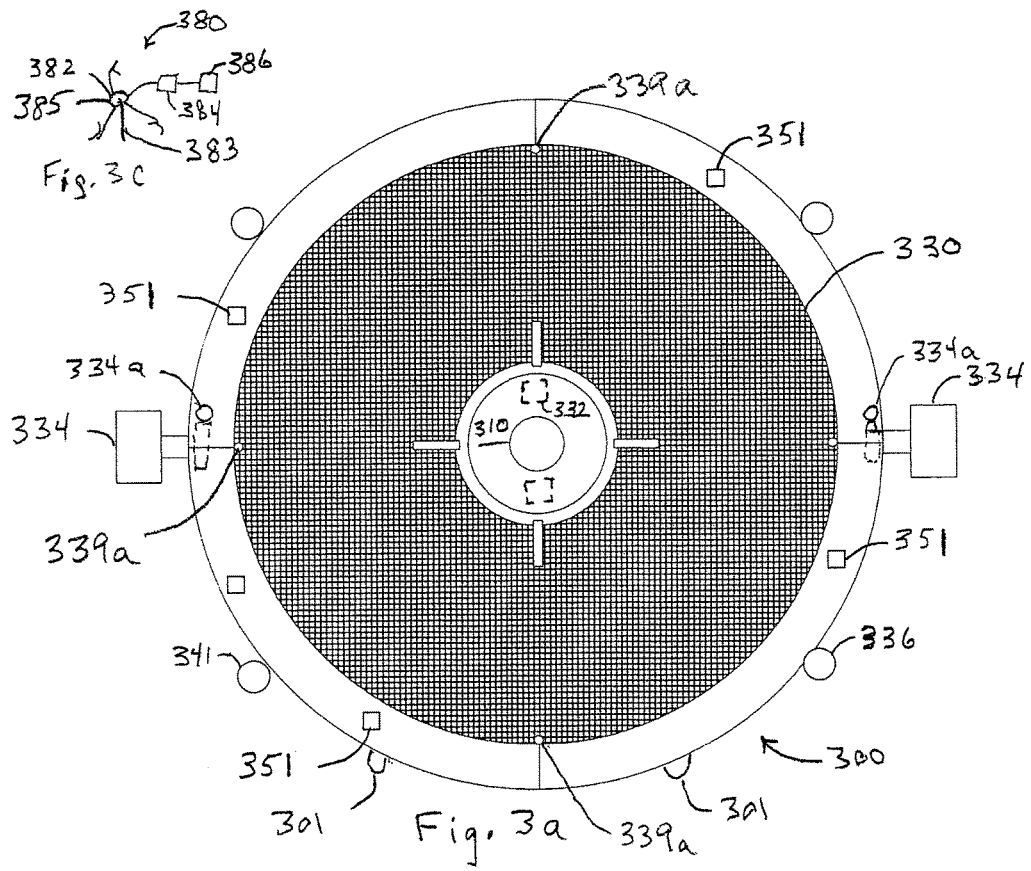

METHOD AND APPARATUS FOR CONTROLLING WEEDS WITH SOLAR ENERGY

CROSS-REFERENCE TO RELATED APPLICATIONS

This application claims the benefit of U.S. provisional patent application No. 60/962,288, filed Jul. 27, 2007, which is hereby incorporated herein by reference in its entirety.

BACKGROUND OF THE INVENTION

Uncontrolled weeds in crop fields may use nutrients and water needed by crop plants, may shade or choke crop plants, may contaminate crop products with noxious or otherwise undesirable weed seed or other parts of weed plants, and may damage harvesting equipment. Weeds in residential lawns and in recreational and commercial areas such as parks, golf courses, and playgrounds are generally unsightly and detract from appearance in addition to interfering with desired plants and activities. Some weeds in pastures may be toxic to livestock or create other undesirable problems, such as cockleburs or briars. Some weeds also release chemicals into soil that interfere with germination or growth of desired seeds. Seeds of weed plants may be introduced into a field or other region via droppings of birds or other animals or via wind or water in addition to being released from weed plants already growing in the field. Some weed seed may also enter via a crop seed mixture.

Numerous strategies, equipment, and chemicals for dealing with weeds have been developed over the years. Conventional weed control strategies include use of pre-emergence chemical herbicides to prevent germination or initial growth of seedlings, mechanical damage to weed plants via manual or machine cultivation, use of chemical herbicides that enter weed plants via absorption through leaves or other plant structures and interfere with weed plant growth, and convective or radiant heating of weeds via combustion of kerosene, propane, or other combustible fuels. Each such approach has its advantages and drawbacks. Mechanical cultivation, whether by machine or by hand tools, frequently results in damage to desired plants directly or through disturbance of soil and roots therein. Manual cultivation via hoe or other hand tools is generally difficult and uncomfortable labor and frequently subjects field laborers to back, muscular, and other pain both during and after performing such work. Manual and other mechanical cultivation also increases loss of valuable topsoil through rain and wind erosion. Heating of weeds using conventional combustion techniques generally involves use of increasingly expensive carbon-based fuels and also contributes to release of carbon dioxide to the atmosphere with potential implications for global warming or other climate changes. Direct heating via open flame is also difficult to control and may thus result in damage to or stunting of desired plants, particularly in large scale applications. Chemical herbicides may also cause damage to desired plants via over-spray or wind drift, and herbicide contaminated rainfall runoff from treated fields and lawns may also cause undesirable effects on downstream flora and fauna, particularly on aquatic or amphibian animals, as well as rural or municipal water supplies. Techniques, sensors, and equipment have been developed to provide more selective or controlled precision application of chemical herbicides, including techniques for variable rate applications of chemical herbicides responsive to weed concentrations detected and mapped via use of overhead sensor systems (e.g., on aircraft or satellites), and spot spraying of herbicides onto specific or individual weed plants using information from ground-equipment-mounted sensors that detect and/or identify individual weed plants. Although much has been done to enhance selectivity, provide rapid breakdown, and otherwise reduce undesirable environmental and ecological effects of chemical herbicides, there is continuing and even increasing concern among environmentalists, ecologists and others about the long term effects on agricultural sustainability and society as a whole of continued or expanding use of chemical herbicides. Various studies have indicated increased incidence of certain diseases or health conditions among agricultural workers regularly exposed to such chemicals. Residues from herbicides, insecticides, and other agricultural chemicals are found in harvested fruits, vegetables, and other crop products as well as in ponds, streams, rivers, and in fish harvested therefrom. Residues from agricultural chemicals are even found in subterranean aquifers as well as rural or municipal water supplies. Some studies have indicated increased incidence of certain diseases or other abnormalities even in non-farming populations exposed to such residues. Concern about potential health implications of residues of agricultural chemicals have led many consumers to be attracted to so-called "organic" or "natural" produce and other agricultural products grown without use of chemical pesticides (i.e., insecticides, herbicides, and fungicides).

To reduce or eliminate impacts of chemical herbicides on crop plants, some crop plants have been "genetically engineered" to tolerate exposure to selected herbicides without significant damage. However, some environmentalists and others fear that development of crops genetically modified to resist selected herbicides will generally lead to increased use of the selected herbicides that may now be sprayed over an entire crop field rather than being applied in a more controlled fashion. There are concerns among environmentalists, conservationists, and within USDA about the long term effects and sustainability of such practices, including effects of current and future herbicides on essential microbes and other micro-organisms in crop soils, potential development of herbicide resistance in weeds via natural selection or via migration of genes from genetically modified crop plants which confer tolerance to selected herbicides, and effects of runoff into surrounding environments, including ponds, lakes, streams, and subsurface water. Consequently, there is a strong push even in conventional as well as organic crop production for using "sustainable" agricultural practices that reduce use of chemicals that may cause damage to crop fields and the environment as a result of long-term use.

Some researchers and lay persons have suggested potential use of concentrated solar energy for damaging weeds, but have not described the controls, safety measures, and other features needed to provide practical, safe, and convenient use of solar energy for weed control. Some researchers have investigated use of concentrated solar energy to damage seed and seedlings but were apparently pursuing concepts for apparatus that could be towed with conventional tractors. The use of such tractors introduces additional costs over the instant invention presented herein due to the requirements for operators and conventional fuel. Furthermore, the slow speed which will generally be needed to provide sufficient exposure of weed plants may not be efficient use of tractor equipment designed to pull significant loads at moderate speeds. Additionally, the heavy weight of conventional tractors may also preclude use of such equipment in wet fields at the revisit intervals needed for effective control of emerging weed plants. Typically, weeds emerge rapidly following significant rainfall which may also render fields inaccessible to conventional equipment during the period of most rapid weed emergence. Thus, when using conventional tractors, access for weed control may be limited at the time when the need for exposure and control of emerging weed seedlings with concentrated solar energy is greatest.

On a different front, instability in price and availability of foreign oil places additional strains and uncertainties on farmers and park and lawn maintenance personnel relative to fuel resources needed to apply herbicides via tractor spray rigs or via conventional aerial application of herbicides (e.g., using "crop duster" aircraft). Many of the conventional weed control techniques and equipment for use in crop production are centered around use of a conventional tractor using conventional carbon-based "fossil" fuels for propulsion within crop fields. Tractors must generally be relatively heavy and use tires with high-traction features for their normal role of towing plows or other equipment. Concerns about burning fossil fuels and contributing to carbon dioxide concentrations in the atmosphere are also driving a need for alternatives that do not require use of fossil-fuel burning internal combustion engines for chemical applications, cultivation, or other means of weed control.

Precision herbicide application devices, e.g., for tractor spray booms, that use sensors to detect weeds in row middles and then make "spot treatment" applications of herbicides, have been available for a number of years. However, these devices are expensive to buy and costly to maintain due partly to collection of spray mist, and dust created by tractor movement, on optical lens and other components of such devices. Furthermore, these devices still use herbicides and may require dedicated use of fuel resources for tractors when weed control is needed independent of other crop production activities. Furthermore, some fields may be inaccessible for extended periods due to rain causing tractors and other equipment carrying heavy chemical and fuel loads to sink into wet, muddy areas in a field, lose traction, or accumulate sticky mud ("gumbo") on conventional tires or treads of tractors and other equipment. In addition, some field areas may be inaccessible to conventional tractors or other heavy ground equipment once irrigation pipes have been installed.

Residential, commercial, and recreational lawns are frequently subjected to comprehensive treatment programs involving pre-emergence herbicides as well as herbicides applied during a growing season. Runoff and permeation of chemicals from such treatments contribute to the chemical contamination of surface and subterranean water supplies.

An object of the instant invention is to provide methods and apparatus to help control weeds in crops, residential and commercial lawns, and in other areas, generally using only solar energy, concentrated to provide a weed damage mechanism, and also, in some embodiments, using solar energy to provide power for propulsion, sensors, and other functions, and thus generally not require use of chemical herbicides or use of conventional fossil fuels for a weed damage mechanism (e.g., via flame heating) or for propulsion of machinery used for weed control.

Another object of the instant invention is to provide cost-effective weed control using concentrated solar energy as the principal weed plant damage mechanism without contaminating agricultural workers, consumers, and the environment with chemical herbicides.

It is another object of the instant invention to provide embodiments of apparatus for implementing effective weed control on different scales including residential weed control, weed control in small organic plots, and weed control in large scale farming operations such as in the Mississippi Delta or in Central Valley, Calif.

Objectives of the instant invention include describing apparatus and embodiments to implement various weed control strategies at various scales ranging from manual, human operated to highly-automated and autonomous robotic systems that can work unattended for extended durations in assigned fields or other locations. Some applications and/or embodiments may use a concentrated, collimated beam, and other applications and/or embodiments may use a converging beam for different applications, or to selectively protect objects beyond a focused spot, where such beam diverges and intensity is reduced. A collimated beam may be used to provide a concentrated intensity level over a broader area (e.g., a spot 0.5 to 2 inches in diameter) which is sufficient to rapidly heat a leaf to a damaging temperature with less risk of starting a fire than might exist if a more highly focused beam comes in contact with a combustible material or heats a surface to a temperature that can ignite a combustible material.

It is another object of the instant invention to provide an apparatus whereby manual control of weeds may be realized with less need for stooping, kneeling, bending over, or using a hoc, thereby reducing fatigue and pain experienced by agricultural and lawn care laborers as well as residential homeowners.

It is another object of the instant invention to provide methods and apparatus for implementing alternative weed control strategies which, in some crops and applications, may emphasize kill of all non-crop or non-desired plants in a field or lawn, and which, in other crops or applications, may tolerate some weed growth but simply emphasize damaging growth terminals of weed plants and/or tendrils to prevent weeds from growing above a certain height so that they will be largely shaded by crop plants as a crop matures and/or achieves "canopy closure" (i.e., where the combination of row spacing and crop plant development substantially reduces the amount of direct sunlight reaching areas below the leaves of crop plants, thereby starving germinating or low growing weed plants of sunlight). In view of environmental concerns and need for sustainable agricultural and societal practices, weed control strategies may be different for different crops and applications, and may also be changed as a function of crop maturity, time in a growing season, and drought or other environmental conditions. Similarly, different damage mechanisms may be selected for different growth sizes and/or types of weeds. For example, some vines have been found to be particularly susceptible to damage to their leaves by using solar energy concentrated, typically in a broader spot (as from a circular lens) or line (as from a cylindrical lens), only to an intensity that provides rapid heating of leaves to temperatures in a range from around 150 degrees Fahrenheit up to a few hundred degrees, thereby causing significant damage and breakdown to cells and photosynthesis and nutrient transport structures within the leaves. For some other weed plants, it may be more efficient and/or more effective to use solar energy concentrated to a higher intensity, typically in a smaller spot, to more rapidly damage selected portions of a plant structure without necessarily attempting to damage the leaves. For example, weeds such as dandelions and others that tend to put out a number of low-laying leaves from a central crown may be more susceptible to more highly concentrated solar energy focused on the central area of the plant where leaf stems joint the root, so that significant localized heating damage to the central area of the plant effectively decouples the leaves from the root, preventing transport of water and soil nutrients to the leaves and transport of critical photosynthate compounds from the leaves to the roots, typically resulting in loss of the leaves and loss of critical nutrients to the root structure. Although the temperature at which cellular damage occurs may still be in a range from approximately 150 degrees to 300 degrees Fahrenheit, the thicker structures of the stems where they join the roots will typically require a higher temperature or extended exposure durations on the exposed sides of the structure so that temperatures of shielded portions of the structure are also sufficiently elevated either via heat conduction or via removal of intervening plant tissue so that essentially all of the stem area is sufficiently damaged to severely impair or prevent its normal nutrient and water transport functions. Although many weed plants are particularly hardy and damage tolerant, and may be able to establish new growth after a few days, repeated treatment of such plants at selected intervals (e.g., every 7 to 10 days) appropriate to different growth rates of different weed plants and environmental conditions (e.g., good rainfall and sunlight or drought conditions) will generally prevent many weed plants from becoming established in a field or lawn. For virtually all weeds, including those that grow from seeds or those which propagate and emerge from root extensions (as in rhizomes), it is generally most desirable to cause damage to newly emerging leaves when they are most susceptible. Early damage to emerging leaves also prevents generation and transport of photosynthate nutrients back to the roots, which will generally be fatal to weed plants newly emerging from seeds, and which will generally at least stunt or impair grown of weeds that propagate via root extension. Thus, to support tradeoffs between conventional use of herbicides and methods and apparatus of the instant invention for weed control, it is generally desirable that the apparatus and methods of the instant invention support frequent and economic re-treatment of crop fields or other areas where weeds are to be controlled. As will be illustrated and described later herein, this need for more frequent re-treatment when using concentrated solar energy as compared to conventional treatment with herbicides or cultivation will generally drive design choices to innovative lighter weight and less expensive vehicles. However, these design trades are readily accommodated by the use of concentrated solar energy requiring typically only lightweight Fresnel lens, or other stepped surface or lightweight conventional lens, or holographic optical elements, or other solar energy concentrating technologies and apparatus, and solar-powered propulsion, so that the burden of carrying the weight of tanks filled with chemical herbicides and fossil fuels is eliminated. By making such vehicles robotic and essentially autonomous, the cost of labor for mixing chemicals and servicing and driving tractors or similar equipment for weed treatment is also avoided or substantially reduced.

Methods and apparatus of the instant invention may be used as a primary method of weed control in some applications, but in other applications and weed control strategies, methods and apparatus of the instant invention may be used as a secondary, backup, or follow-on treatment of weeds in a hybrid strategy combining use of convention control methods with use of methods and apparatus of the instant invention. For example, conventional herbicides or cultivation may be used for initial control of a typically heavy growth of weeds that may be allowed to develop, or even be desirable to prevent soil erosion, over a winter or other period when no crop is being grown in a field. After an initial treatment or mowing controls most of the weeds, methods and apparatus of the instant invention may then be used to control weed seedlings or continued growth or re-emergence of weeds not killed by conventional initial control methods. Similarly, selected capabilities of the instant invention may be used to provide spot treatment capabilities for individual weed plants or patches of weed plants that have developed resistance to, or are not otherwise controlled by, conventional herbicides.

Some embodiments of the instant invention comprise units that may be worn as a backpack by individual laborers to provide a weed control device that may be operated much like a conventional backpack sprayer, but which uses a completely different damage mechanism, namely concentrated solar energy. Other embodiments comprise inexpensive, autonomous, solar powered, robotic, lightweight unmanned ground vehicles and/or lighter-than-air or almost-lighter-than-air, very low altitude (e.g., six feet above ground level) unmanned robotic air vehicles that may employ global positioning system (GPS) and/or Differential GPS systems or other means for navigation and precision location reference, may employ sensors to detect and/or identify weed plants, may use solar photovoltaic cells to provide electric power for propulsion motors, and may use Fresnel lens or other stepped surface lens or holographic optical elements, diffractive optics, binary optics, or other solar energy concentrating techniques and apparatus, and light guides, to collect and deliver concentrated solar energy to damage leaves and other portions of weed plants. For example, such systems may:

(1) use differential GPS navigation to drive or "fly" slowly (e.g., 0.25-5 mph) in a controlled pattern (e.g., down rows) within or just above a crop field, (2) use RF, laser/optical, and/or ultrasonic/acoustic sensors, and signal and/or image processing technologies, which may include pattern recognition, digital or optical correlation, spectral analysis or spectral intensity ratios (e.g., in some embodiments just detecting green vs brown) to detect non-crop plants (i.e., weeds) in crop fields, and (3) use concentrated solar energy to damage one or more selected portions of non-crop plants, wherein solar energy may be
  (a) collected above a crop and concentrated via a large (e.g., 1 meter) Fresnel lens or an array of smaller Fresnel lens or holographic optical elements, and
  (b) delivered to targeted areas of crop plants through (i) an optical train comprising lens and mirrors, (ii) one or more optical fibers, (iii) other optical guides, or (iv) some combination of the above.

Various embodiments of the instant invention will benefit not only organic farmers, who want to produce products free of chemical contamination, but also conventional farmers who must deal with issues of costs, herbicide resistance, environmental and regulatory implications of agrochemicals, and consumer acceptance of chemically treated or genetically modified crops. Other embodiments will benefit residential or commercial lawn and park owners and/or landscape maintenance personnel concerned about environmental and health implications of use of chemical herbicides. Other beneficiaries include cattle, dairy, and other livestock or livestock product producers concerned about toxic and other effects of weeds on their livestock and hay harvesting equipment but who may also be concerned about exposing livestock to chemical herbicides.

As noted, conventional approaches for pest weed control suffer from risks of resistance development to herbicides in some weed species for which control is desired as well as reduced consumer acceptance of use of agricultural chemicals (e.g., witness increasing market for "organic" and "natural" products produced without chemical pesticides or genetically modified crops). The use in some embodiments of the instant invention of precision sensors and precision targeting of individual weed plants significantly reduces concerns with development of resistance since the energy needed for a desired "kill" or other selected effect can be applied with less concern about collateral damage to non-targeted resources. Some embodiments of the instant invention may be used in conjunction with conventional herbicide applications, wherein methods and apparatus of the instant invention may be used to detect and/or provide a "follow-up" treatment of weeds that have developed a resistance to chemical herbicides.

Targeted areas of weed plants may be selected to attempt to kill a weed plant or to simply induce sufficient damage to growing tips, tendrils, and other key portions of weed plants so that the weeds are kept below the crop canopy or below a level where the weeds could interfere significantly with development, maturation, and harvesting of the crop.

BRIEF SUMMARY OF THE INVENTION

The instant invention, in various embodiments, integrates the controls, power sources, propulsion, navigation, and beam pointing methods and apparatus into manually operated or autonomous, automated equipment needed to implement effective strategies for use of solar energy for weed control, thereby reducing need for use of chemical herbicides for weed control.

BRIEF DESCRIPTION OF THE SEVERAL VIEWS OF THE DRAWINGS

FIG. 1a is an illustration of an embodiment of the instant invention that may be carried in a backpack assembly and operated manually by a human operator.

FIG. 1b is an illustration of a top down view of the assembly of FIG. 1a showing shutters for intensity control and representative placement of actuators and antennas.

FIG. 1c is an illustration of a side-on sectional view of the solar concentration unit of the backpack assembly of FIG. 1a.

FIG. 1d is an illustration of an optional mounting bracket for a solar concentration unit similar to that illustrated in FIG. 1b and FIG. 1c.

FIG. 1e is an illustration of another view of the optional mounting bracket of FIG. 1d showing the underside of a solar concentration unit similar to that illustrated in FIG. 1b and FIG. 1c.

FIG. 1f is an illustration of a top-down view of an array of lens, such as Fresnel lens, that may be used to concentrate solar energy into optical fibers or other waveguides or optical light guides.

FIG. 1g is an illustration of a side-on view of an embodiment of an assembly for concentrating solar energy into optical fibers or other waveguides or optical light guides using one lens array as in FIG. 1f for concentration and another lens array to promote collimation and acceptance of concentrated energy into such fibers or waveguides.

FIG. 1j is an illustration of another embodiment of the instant invention that may be operated using one arm and hand to control beam intensity and direction.

FIG. 1k is a top-down view of the solar concentration unit of FIG. 1j showing shutters used to control intensity.

FIG. 3a is an illustration of a top-down view of a buoyant air vehicle using a film of solar cells for electric power for propulsion and other uses and a solar energy concentration and control assembly for damaging weeds.

FIG. 3b is an illustration of a side-on cutaway view of the air vehicle of FIG. 3a showing representative placement of concentrated beam director and electric thrusters and other features.

DETAILED DESCRIPTION OF THE INVENTION

Figure 1I:
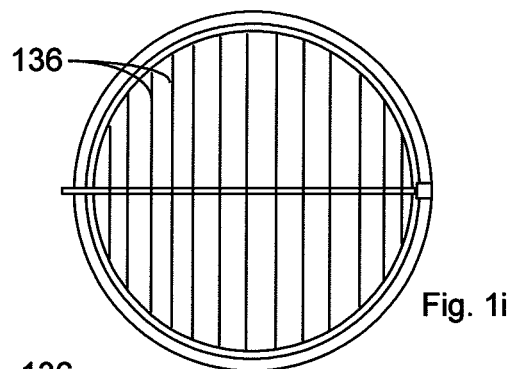
FIG. 1i is an illustration of a top-down view of the solar energy concentrator of FIG. 1h showing shutters used to control beam intensity.

Weed control devices and systems of the instant invention involve innovative integration of several technologies to address problems and concerns with conventional practices and to offer a relatively inexpensive but effective weed control capability. Some embodiments of apparatus of the instant invention may comprise a combination of "smart" sensors and related information technologies, including machine vision technologies, GPS chipsets, and flight control and stability technologies, lightweight thin film solar photovoltaic technologies, high-efficiency electric motor and propulsion technologies, strong and lightweight material technologies, and optical fibers and fiber coupling techniques or other optical light guide technologies.

Weed control methods of the instant invention generally include application of concentrated solar energy to kill, stunt, or otherwise damage or impede weed growth according to various weed control strategies. In various applications, concentrated solar energy may be applied to seedlings, growing tips including terminals and tendrils, central portions or crowns, broad leaves, flowers, seed pods, or other portions of weed plants that may be selected according to type or species of weed. In most cases, re-treatment will be needed at intervals of approximately seven to ten days to attack new weeds or new growth of weeds treated previously.

As noted earlier herein, multiple embodiments of weed control apparatus of the instant invention range from manually operated human-carried hand-held or "backpack" units to highly autonomous robotic, solar powered ground and/or air vehicles.

FIG. 1a illustrates another example embodiment of a "backpack" weed control unit 100. In this example embodiment, a diameter of an overhead solar energy collection assembly for weed control unit 100 may actually provide shade for a user. Backpack weed control unit 100 typically includes features to support or enable various functions including orienting optical elements to provide near maximum or enhanced collection of solar energy as a function of time of day; collecting or concentrating solar energy into light guides 110 which may be flexible or include flexible sections 112 to allow concentrated solar energy to be transported below a partially closed crop canopy or, in some embodiments, to be transported longer distances from a solar collection unit 114 placed, optionally on a support stand, in direct sunlight in order to apply concentrated solar energy and control weeds which may be growing in nearby shaded areas; controlling intensity of sunlight including generally an "off" position, a "pointing illumination" position providing sufficient illumination for an operator to see where a high intensity beam will strike when activated, and a "high intensity" or "treatment" position; providing an efficient, convenient and comfortable means for a user to control location of application of concentrated high intensity solar energy 116 to selected portions of weed plants 118; providing user controls and conveniences to allow efficient and comfortable use of backpack weed control unit 100, and, in some embodiments, processing functions to enable automation of other operational functions and/or data collection functions, such as using still or video camera or spectral sensor 122 for collecting photographic, video, or other information on weeds and/or user performance for additional follow-up treatments and/or quality control purposes (such information may be collected, for example, along with position reference and time information, e.g., using a GPS receiver 120 and clock 124, to generate maps of locations of problematic or operator missed weed areas). Light guide 110 may include connectors that allow light guide 110 to be separated from concentrator 114 or other components for convenient storage. Optionally, an output from a video camera 122 may be displayed on optional display devices 150, 151 to assist a user in selectively targeting weeds 118 versus crop plants, flowers, or other desired plants. Such a feature may also reduce a need for an operator to stoop or bend over significantly to observe and distinguish weeds from desired plants, thereby potentially reducing user fatigue and enhancing user productivity in controlling weeds. In different embodiments, selected ones of these functions may be implemented automatically or manually. For example, for applications where laborers work for extended times in fields having rows of uniform direction (as in many Delta, Central Valley, and other flat cropping areas), pointing of optical elements in azimuth and elevation to enhance solar energy collection may be controlled manually via adjustment of use position or adjustable joints, or via mechanical linkages or via electrical controls and actuators, perhaps augmented by audible or other feedback from solar alignment sensor 126 to help a user determine when adjustment is desirable. However, in some embodiments and/or applications, it may be desirable and cost effective to provide semi-automatic or automatic controls help point and configure optical elements for optimum or enhanced collection of solar energy. In this example of a backpack embodiment, a structure supporting a large Fresnel lens, other stepped surface lens, a holographic optical element, or other conventional or known devices or elements for concentrating solar energy, including optical elements made using techniques of diffractive optics and/or binary optics, or preferably an array 128 of Fresnel lenses or other such solar energy concentrating devices for concentrating solar energy into light guides 110a (FIG. 1c), but also possibly including an array of bundled optical fibers or light guides spread as in a fiber optic magnifier and typically having reflective, generally conical openings for collecting light 111 from lens or lens array 128, and having a total solar energy collection area of approximately one to two square meters (collecting nominally about 1 kilowatt of solar power per square meter), may be used to collect solar energy and deliver concentrated solar energy to a light guide 110 which preferably has a combination of flexible 112 and rigid 113 sections as described more fully below to allow a human operator to easily and conveniently control delivery of concentrated solar energy to weed plants 118 and/or to selected portions thereof. In some embodiments, one or more Cassegrain or other reflectors may be used to collect solar energy and focus or concentrate it into light guides. Light guides, in this application, may comprise solid or hollow optical fibers, rods, tubing having a mirrored or otherwise reflective surface one an inner or outer diameter, or other known light guides. Depending upon intended application and weed control strategy, section 113 of light guide 110 may be curved to allow solar energy to be delivered conveniently in a top-down or a side-on direction, and at an angle which minimizes risk of damage to crop plants or other non-targeted plants or other objects. An optical unit 132 located near a lower end of a rigid light guide section 113 may be used to focus concentrated sunlight from light guide 110 to a small spot (e.g., typically smaller than about 0.5 inches in diameter), to collimate light from light guide 110 to provide a generally collimated beam having a typical diameter ranging from approximately 0.25 inches up to approximately 3 to 4 inches, or to a linear or elliptical pattern having a major length dimension ranging from approximately 0.25 inches up to approximately 3 to 4 inches. In some embodiments, optical unit 132 may also be used to spread light from light guide 110 to diverge at a selected angle or in a selected pattern. Separate, interchangeable optical units 132 may be used to provide spot, linear, or other weed control beam pattern as desired for a particular application, or a single optical unit 132 having movable optics (as in a zoom lens) or electro-optically controlled optics (e.g., liquid crystal devices or other optical modulators) may be used to change weed control beam patterns during use responsive to control inputs from a human operator or from a sensor. Such control inputs may be provided mechanically (e.g., as by a control lever or trigger 134 coupled to a cable sliding in a sheath) or electrically (using conventional electrical trigger switches, thumb-levers and the like and wherein optical unit 132 may include solenoids, servomotors, or other devices responsive to control inputs).

In most embodiments, it will be desirable to also control intensity of sunlight delivered through light guide 110 so as to prevent unintended damage to plants, personnel, or other things. Although control of sunlight intensity could be implemented by various mechanisms incorporated or integrated with light guide 110, due to the power levels involved in concentrated sunlight and potential heating effects after sunlight is concentrated, it will generally be desirable to control intensity of sunlight before it is concentrated. Such control may be provided using any of several techniques or mechanisms, or combinations of techniques and mechanisms. In some embodiments, a set of slats 136 (FIGS. 1b and 1c), similar to those used in signaling lamps on ships, or similar to those used in Venetian blinds, may be rotated separately or in unison about their lengthwise axis to control sunlight intensity reaching or emerging from solar concentration array 128, which as noted may be an array of Fresnel lenses, holographic optical elements, or other concentrating devices. Slats 136 are preferably positioned just above solar concentration array 128, before sunlight is concentrated. In some embodiments, slats 136 may also provide another function of reflecting sunlight into solar concentration array 128, as described later herein, or reflecting light toward an array of solar photovoltaic cells for generation of power when sunlight is not being concentrated for weed control. Sunlight intensity may also be controlled via use of one or more iris shutter devices such as found in camera shutters that move specially shaped overlapping "leaves" made of metal or other sheet material so as to control size of one or more apertures through which sunlight may be transmitted. Other techniques for controlling sunlight intensity may include use of other devices that mechanically control aperture size or that otherwise control an amount of light transmitted through an aperture, or use of electro-optical techniques and devices, including liquid crystal displays and PLZT (lead lanthanum zirconium titanate) devices that control transmissivity through an aperture in response to an electrical input. In many embodiments, sunlight intensity may be controlled by a hand lever 138 or similar human operator interface. For example, a cable sliding in a sheath 140 or a similar device may be used to couple a hand lever control 138 to a linkage controlling movement of slats 136 as shown in FIGS. 1a and 1c. Generally, slats 136 or other mechanically operated light intensity control devices will be spring-loaded to a normally closed position, e.g. using a spring 129. One or more "detent" positions may be implemented by various known mechanisms (e.g., spring loaded ball seated in a shallow recess) in the intensity control linkage path (e.g., in the hand lever, cable assembly, or slat linkage) to allow an operator to select a position wherein sufficient light intensity is transmitted to and through light guide 110 to enable accurate pointing or positioning of beam 116 before additional movement of lever 138 or another control (e.g., a mechanical trigger) is used to admit a higher intensity of sunlight into and through light guide 110. In some embodiments, to reduce potential operator fatigue, control of light intensity may be implemented via use of triggers, pushbuttons, thumbswitches, thumb operated levers, or similar electrical controls that control relays and/or electrical solenoids or servo-motors which, in turn, control mechanical slats 136 or other devices that control light intensity.

In some embodiments, to support an enhanced level of automation or other purposes, attitude reference may be provided by an attitude reference unit 142, which may be 3-axis electronic magnetic compass, miniature inertial guidance or navigation unit such as used in some virtual reality headsets, small unmanned air vehicles, or other applications; or GPS or differential GPS receivers with multiple antennas 144 mounted on solar concentration assembly support frame 146. In some embodiments, solar concentration assembly 148 may be gimbaled separately from frame 146 (as in a multi-axis gimbal structure that allows the plane of solar concentration device 128 and assembly 148 to be oriented in azimuth and elevation so as to be perpendicular to a line of sight to the sun). Optionally, electro-optic devices such as liquid crystal screens or PLZT devices controlled by electrical controls such as switches and potentiometer levers and the like may be used instead of or in addition to slats 136 to control light intensity. Electrical power for electrically operated devices and controls may be provided by a battery 124 which may be integrated into backpack assembly 125 or otherwise worn by a user. Battery 124 may be charged in some conventional manner prior to use with backpack weed control device 100 or may be charged prior to, during, or after use by solar photovoltaic cells 147, also referred to as photocells, capable of generating electricity from sunlight which may be integrated upon or into solar collector support structure 146 supporting solar concentrator assembly 148 or elsewhere on the backpack or into a vest or other garment worn by the user. Optionally, controls may be operated using electric power provided directly from photocells without use of a battery, or perhaps using a capacitor 124a to store a charge to help drive solenoids and the like. Also, as noted, in some embodiments, electrical power may be provided to and also used to control optical unit 132 to select among focused, collimated, or divergent beam options.

As noted, in most embodiments, it will generally be desirable to provide one or more pivot or gimbal mechanisms or flexible joints 160 so that Fresnel lens or other solar concentration assembly 114 may be manually or automatically adjusted so that a central optical axis of a Fresnel lens in the array or other solar concentration assembly 114 is pointed toward the sun (e.g., so that a Fresnel lens plane or sheet is oriented perpendicular to a path from a user to the sun) as the sun moves overhead and as a user moves about the field. For example, one or more manual or electrically controlled mechanisms similar to that used to remotely adjust externally mounted rear view mirrors from within a vehicle may be used. An adjustable joint 160, which may be a ball and socket joint, a universal joint, or other flexible or pivoting joint assembly, may be used to provide a pivot mechanism whereby solar concentration assembly 114 may be tilted over a range of up to approximately 30 or 45 degrees or more in any direction from horizontal. A length of flexible light guide may be routed adjacent to joint 160, or may be extended through an opening in joint 160, to provide for transmission of concentrated solar energy through or around joint 160. In some embodiments, solar concentration assembly 114 may be rotatably mounted in a support frame 101 (FIG. 1d, 1e), which may be in a shape of a wide, shallow "U," rotatably affixed to a top of a section of rigid tubing 109, which may also include a section of light guide 110, so that a gimbaled mount is provided that permits rotation of solar concentration assembly 114 in azimuth and elevation. In such a mount, concentrated solar energy may be passed from solar concentration assembly 114 into light guide 110 via either a section 102 of flexible light guide, or via an optical joint wherein mirrors tilted typically at 45 degrees with respect to a line of sight down each joint section, but facing each other across a movable joint, which has the same axis of rotation as the elevation rotation of assembly 114 mounted in aforementioned U-shaped frame, may be used to transmit concentrated solar energy from solar concentration assembly 114 into light guide 110. Connection 103 may be designed to permit rotation of frame 101 relative to a support tube 109, and knobs 104 may be used for conventional manual adjustment of a tilt angle of frame 147. A tilting force for solar concentration assembly 114 may be provided via multiple sheathed control cables (e.g. three or four) coupled to a pivoting tilt control lever 162 similar to an assembly typically used in manual remote controls for externally mounted rear view mirrors, but larger to handle greater forces. Tilt control lever 162 may be mounted on light guide 110 or may be mounted on a separate tube or other structure, where it may be controlled by a user's other hand. A sun alignment detector 126 may be used to provide feedback to a user to indicate when near optimal alignment has been achieved, or to indicate in which direction solar concentration assembly frame 146 or solar concentration subassembly 148, if gimbaled separately from frame 146, should be tilted to obtain more efficient collection of solar energy. Sun alignment detector 126 may be coupled to optional display 150, 151 or may be used to provide audible signals (e.g., using different frequencies or patterns or using speech synthesis) to a user via speaker 154 or other means to indicate when and in what direction solar concentration frame 146 or assembly 148 should be tilted. In some embodiments, sun alignment sensor 126 may be replaced with or augmented with a concentrated solar intensity sensor 164 which may sample a portion of sunlight concentrated in light guide 110 and provide an output to a display 150, 151 or to an audible tone device 154 to provide feedback so that a user can determine if a desired intensity threshold has been obtained, or to indicate when adjustment of tilt angle of solar concentrator frame 146 or assembly 148 provides greater intensity.

In some embodiments, solar pointing may be attained by use of a mirrored surface on a surface 136a of slats 136 which may also be used to control intensity of sunlight admitted into solar concentration assembly 148, and adding a capability for rotating a slat mounting frame 137 or other structure supporting such slats 136 so that the lengthwise axis of rotation of individual slats 136 may be rotated in angle so as to be generally perpendicular to a line of sight to the sun. Such rotation in azimuth may be provided by a circular frame 137 mounted within external frame 146 as illustrated in FIG. 1b, wherein circular frame 137 may be rotatably supported within external frame 146. For example, circular frame 137 may be supported by ball bearings and/or roller bearings or other low friction bearings about its periphery, or circular frame 137 may be supported by structural elements extending from a central axis affixed to or within external frame 146. Azimuth orientation of circular frame 137 may be determined using a magnetic field sensor 139 (e.g., such as a Honeywell HMR3000 or 3500 electronic compass module, although a Honeywell HMC6352 module or similar module may provide adequate azimuth accuracy) mounted on circular frame 137 to sense at least azimuth direction of circular frame 137. An output from field sensor 139 may be provided to a processor 166 which may also be provided information (e.g., latitude, longitude, altitude of a crop field) on a location where backpack weed control device 100 is being used (e.g., via manual entry of data such as via a plug-in keyboard or via wireless link from a computer, or automatically via an optional Global Positioning System (GPS) receiver 142 or similar precision location reference source). Using a digital clock or other time reference and well known conventional algorithms, processor 166 may be used to determine appropriate angles in azimuth and elevation to the sun from the user's position as a function of time of day. Optionally, a multi-channel GPS receiver and multiple GPS antennas 144 may be used to monitor location, orientation, and attitude of frame 146 or slat support structure 137. This information may be used in a control system, which may use processor 166, to automatically actuate motors 155 or other actuators to rotate circular ring 137 until slats 136 are in proper azimuth orientation to serve as reflectors for solar energy (i.e., visible sunlight and other spectral components) when slats 136 are actuated by a user. Elevation information from processor 166 may also be used to control a servomotor or other actuator 169 that controls a position of a bumper stop, cam, or other device 170 which, in conjunction with a cam follower, probe, or other structural contact element 172 on a rod or other structural element 174 that may be used to control an angle of slats 136, upon user actuation via handle 134 and cable-in-sheath 140 or other conventional means, from a normally closed or almost closed position of slats 136 so that slats 136 are positioned upon such actuation to reflect near maximum solar energy rays 176 onto Fresnel lens array 128 or other solar concentration mechanism as illustrated in FIG. 1c. Where actuator 169 is located on rotating circular ring 137, wires for power and control signals may be routed via a central portion of assembly 148, and rotation of circular ring 137 may be limited to plus or minus 180 degrees or so to avoid over-twisting such control wires.

In another example embodiment, a relative sun angular position sensor 178 may be used to determine azimuth and elevation position of the sun as viewed from a coordinate system associated with solar concentration assembly frame 146. Sun angle position sensor 178 may comprise a filtered or shaded wide-angle lens or reflector positioned to project or cast an image of the sun onto a focal plane from which frame-relative azimuth and elevation direction to the sun may be determined by processing or thresholding focal plane outputs to determine which pixels are receiving greatest intensity (e.g., pixels upon which an image of the sun is being projected via lens or a reflector). Outputs from sun angular position sensor 178 may be used to control azimuth orientation of slat support ring 137 and may also be used to control position of a stop or cam 170 that controls an open angle of slats 136 when slats 136 are rotated in response to user action or input so that solar energy is efficiently collected and reflected via reflective surfaces 136a onto solar concentrator 128, which concentrates solar energy into light guide assembly or assemblies 110a for transmission via light guide 110 to optical unit 132 where beam characteristics may be modified as desired (e.g., into a small spot, a line, a collimated beam of approximate diameter ranging typically from about 0.25 inches up to approximately 2.0 inches, or even a divergent beam, where desired to prevent damage to desired plants or other objects in a path of weed control beam 116.

Some embodiments of a backpack weed control unit 100 may also include or be used in conjunction with a non-contact temperature sensing device 123, such as an infrared detector or pyrometer, capable of estimating surface temperature based on infrared radiation radiated from an object. For example, an infrared detector for a non-contact temperature measurement capability may be integrated into optical unit 132 or affixed to light guide section 113 so as to permit measurement of temperature of weed leaves or other portions of weed plants 118 being irradiated and treated with concentrated sunlight. An output from such a detector may be used to provide a human readable temperature (displayed, for example, in optional display 150 or optional display 151), may be used to provide an audible beep, synthesized voice, or other sound (e.g., via speaker 154) when a selected temperature is exceeded, or may be used to provide an audible output wherein a frequency, intensity, or pulse rate may be configured to be proportional to surface temperature of a leaf. Such displays or sounds may be used to allow a human operator to determine when a leaf or other portion of a weed plant has received sufficient energy to be heated to a selected temperature where heat damage sufficient for desired control is virtually assured. Different temperature thresholds may be needed and/or may be pre-selected for different weed plants or different applications.

Some embodiments of a weed control device 100 may include additional items for user comfort and safety. For example, a fan 153 powered by solar energy may be included to provide comfort and reduce perspiration, particularly on the forehead. This may be important since, for many applications, it may also be desirable for a user to wear protective eyewear 157. Protective eyewear may include an automatic capability, similar to that found in modern welding helmets, to control transmission of light through eyewear 157 in response to intensity of light arriving at eyewear 157 or a sensor 157a associated with such eyewear. In some embodiments, sensor 157a may be located on light guide 113 or functions of sensor 157a may be integrated with other sensors already described. In some embodiments, eyewear transmissivity may be controlled in response to use activation of lever 138 or other control that controls intensity of solar energy applied to a weed 118 or other plant. In some embodiments, eye protection may be provided by a screen capable of controlling intensity of transmitted light attached to light guide 113. Shields may also be incorporated around a lower end of light guide 113 to protect others from viewing projected lines or spots of solar energy.

FIGS. 1f and 1g illustrate optional configurations for a solar energy concentrator that may provide a wider acceptance angle. In this configuration, an array 190 of Fresnel lens, holographic optical elements, or other light focusing devices having a relatively short focal length may be used to partially concentrate incoming rays 196 of solar energy onto corresponding elements of a second array 192 of Fresnel lens, holographic optical elements, or other refractive elements having a generally negative focal length that causes converging light rays 191 from elements of array 190 to emerge from array 192 in more or less collimated beams 193 of concentrated solar energy which may be directed into collection apertures 194 of optical fibers or other light guides, which collection apertures may include other optical elements such as spherical lens or reflective codes to enhance acceptance of light from beams 193. Where solar concentration is significant, elements of arrays and light guides may be mounted in a material such as ceramic foam capable of withstanding exposure to misdirected beams 193 without damage.

Figure 1H:
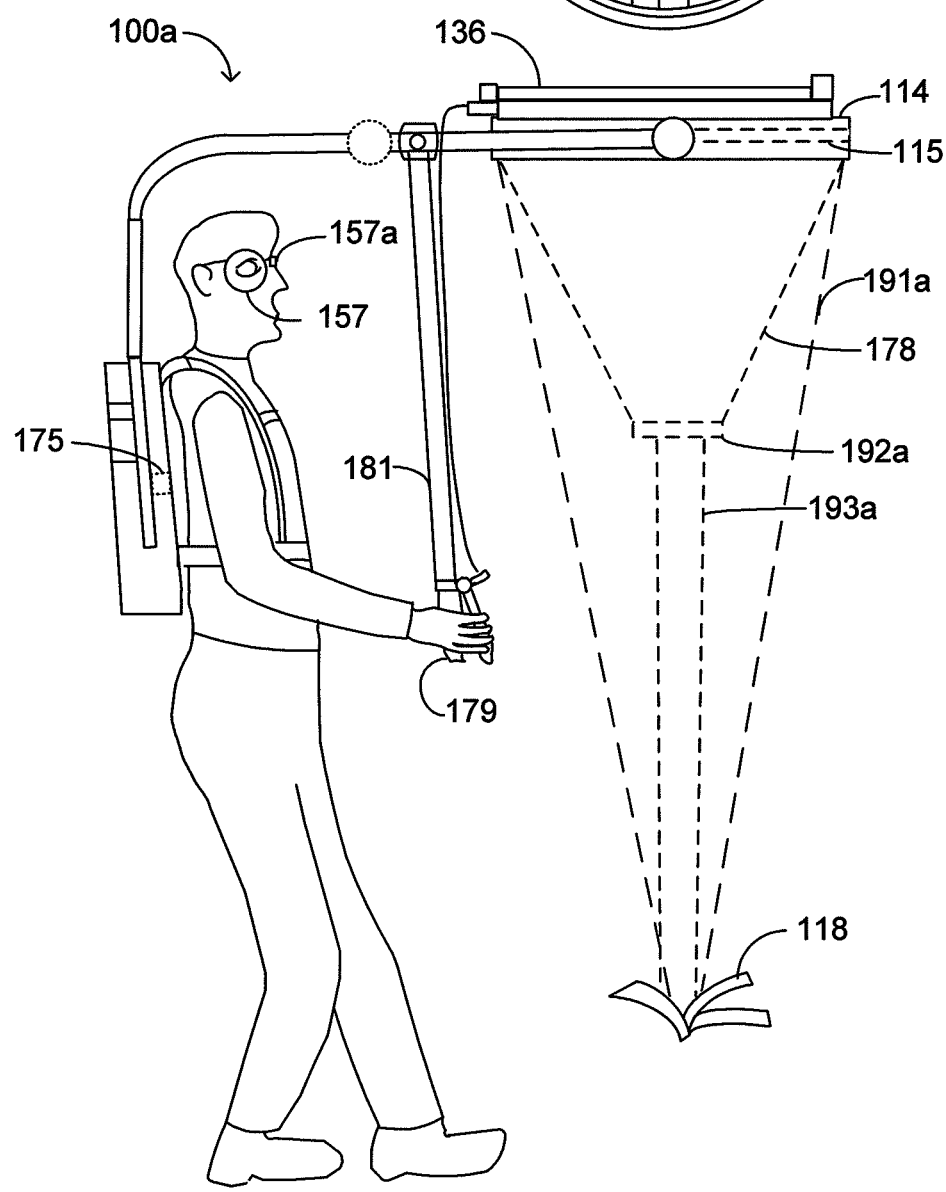
FIG. 1h is an illustration of another embodiment of the instant invention using a harness mounted single large lens to concentrate solar energy and hand controls to control beam intensity and direction.

FIGS. 1h and 1i illustrate a simpler embodiment for a backpack unit 100a wherein a user may use handholds 179, lever arms 181, and an optional pivoting mount 175 to control application of solar energy collected and concentrated via unit 114 to weed plants 118. Such energy may be focused directly via rays 191a from an embodiment of element 114, which may include a Fresnel lens 115 having a relatively long focal length (e.g., 4 to 7 feet for a representative range of user heights), or via a collimating lens 192a producing a generally collimated beam 193a from solar energy 178 concentrated via unit 114 (e.g., using a Fresnel lens with a shorter focal length), and having sufficient intensity to heat weed leaves and/or other weed plant components to a damaging temperature with reduced risk of providing sufficient intensity to ignite objects in a path of beam 193a. Some shielding or screening may be included in lens support structure 178 to prevent concentrated light from concentrator 114 from being focused on unintended objects, or support structure may simply be an open frame of rigid wire or similar material. Backpack unit 100a may include features as described earlier for backpack unit 100, particularly intensity control slats 136 and related control mechanisms.

FIGS. 1j and 1k illustrate a simpler handheld unit 100b that may also be used to concentrate and apply solar energy to weed plants 118 (FIG. 1h) via directly concentrated solar rays 191a or via rays 193a more or less collimated by lens 192a. In this embodiments, and elbow cup 184 and handgrip 186 allow a user to comfortably control tilt angle and other aspects of operation of unit 100b. Optional light intensity slats 136 operated by hand lever 187 may be included as described earlier herein. Length of structural member between handgrip and elbow cup may be adjustable to accommodate different users.

Other possible embodiments of weed control devices of the instant invention include devices having a solar concentrator positioned at an upper end of a tube which functions as both a structural member and a light guide for transmitting concentrated solar energy from such solar concentrator down to an open aperture at a bottom of the tube, or to an optical unit which be adaptable or replaceable to control characteristics of an emerging weed control beam, which may be directed at weed plants by operator movement of the tube. An operator may also adjust tilt and other orientation of solar concentrator to enhance collection and concentration of solar energy. Such an embodiment may have specific intensity control features and capabilities, as describe above, or intensity control may be provided by an operator simply rotating or otherwise changing an orientation of solar energy collector so as to reduce or effectively stop collection of solar energy.

By using focused or otherwise concentrated solar radiation as a "kill" or damage mechanism, chemical contamination of the soil and surrounding environments is avoided. Because precision "kill" and damage mechanisms of the instant invention may use solar energy concentrated upon individual weed plants either directly as concentrated radiation or, in some embodiments, indirectly as heated air, resistance buildup will be much less of a problem compared to broadcast application of chemical herbicides for which concentration limits apply to prevent environmental or crop damage. When necessary, energy concentrations and dwell times may be increased so that sufficient energy may be applied to obtain a desired effect on an individual weed plant. Furthermore, as shown later herein, since sunlight can be concentrated and directed using one or more of several lightweight technologies such as Fresnel lenses, other stepped surface lenses, static or dynamic holographic optical elements, mirrors and other reflectors, and conventional or hollow optical fibers or other light guides, and thus do not have to carry tanks of herbicides, combustible fuel, or other consumables, it is possible to use lightweight ground and even buoyant air vehicles to transport the apparatus needed to implement the kill mechanism. By making innovative combinations of a lightweight apparatus used to implement concentrated solar energy as a weed control mechanism with other navigation and sensor technologies, and by using solar photovoltaic cells implemented, for example in thin films and/or panels, to provide electricity for electric propulsion and sensing, navigation, and control functions, robotic and highly autonomous ground and air vehicles may be used to implement weed control methods of the instant invention in row crops and other large scale applications.

More automated or robotic apparatus or implementing use of concentrated solar energy for weed control may take advantage of existing infrastructure and technologies. Many if not most large scale farming operations now have differential GPS offering precision position reference with accuracies of approximately one inch. Such position reference capabilities may be added inexpensively in areas where not currently available. Consequently, precision GPS may be used for position reference, navigation, flight control, and even attitude control and stability of robotic ground or air vehicles (200, FIGS. 2*a*, 2*b*, and 300, FIGS. 3*a*, 3*b*, respectively), particularly those used in agricultural applications. Furthermore, additional precision position reference capabilities are becoming available from cell phone systems, miniature inertial guidance systems, localized ladar or other laser-based systems, and other systems employing pseudo-random-noise (PRN) or other coded waveforms. In addition, directional control systems for tractors and other agricultural vehicles that use ladar, laser scanning, stereo vision, pattern recognition, and similar techniques for steering and other navigation functions are also becoming available.

These navigation and control technologies may be integrated with solar-electric propulsion technologies into lightweight robotic ground vehicles, or into lighter-that-air, or almost-lighter-than-air, buoyant robotic air vehicles for application in implementing methods of the instant invention for weed control. Solar-electric propulsion is practical for use in weed control applications of the instant invention since significant traction and power to pull cultivation equipment, or to carry heavy loads of herbicide chemical mixtures and/or fuel, are not necessary. Combining concentrated solar energy for weed control with solar-electric propulsion in lightweight vehicles enables inexpensive, lightweight, autonomous robotic ground and/or air vehicles that are needed to provide a frequent re-treatment interval to prevent or control growth of weeds without use of chemical herbicides.

In one example weed control strategy, robotic weed control ground vehicles may move constantly up and down rows in a field crop during daylight hours, using concentrated solar energy to damage weed plants, and then stopping and remaining in-place after the sun is too low in the evening to permit effective operation. In some embodiments, such vehicles may include wireless security systems and alarms to detect and report tampering overnight or at other times. Weed control vehicles may use solar energy concentrated by cylindrical Fresnel lens or other apparatus into "kill lines" of intense solar energy which may be directed into and transported down row middles 261 (FIG. 2*b*), 361 (FIG. 3*b*) to kill weed seedlings or stunt growth of weed plants growing in row middles. Using modern position reference and navigation technologies, "kill lines" may be extended up the sides of rows typically to an area approximately two inches from where crop plants are planted in designated crop areas 260 (FIG. 2*b*), 360 (FIG. 3*b*). After crop plants have grown to a point where their stems are more hardy near the ground, a "kill line" of concentrated solar energy may even be allowed to overlap and extend onto the lower portions of the stems of crop plants so as to preferentially damage young weed plants or tendrils without causing significant harm to crop plants. This is similar to techniques wherein lower stems of crop plants may be exposed to, and have been shown to be tolerant to brief exposures to, flames or hot air from flame treatment of weeds in order to provide a degree of control of weeds growing within a row of crop plants.

Optionally, sensors (e.g., such as those currently used to control spot applications of herbicides) may be used to detect weed plants 218, 318 growing in row middles 261, 361 and provide signals to a beam director 240, 340 so that a more concentrated beam of solar energy may be directed at such weed plants as weed control vehicles 200, 300 pass over such detected weed plants.

Different soil types, rainfall, field conditions, and especially typical wind velocities during growing seasons may lead to selection of robotic ground vehicle versus robotic air vehicle embodiments for different crop regions in the U.S. or in other parts of the world. For example, typically greater rainfall or irrigation of crop fields in the Mississippi Delta, and relatively low wind velocities during prime growing seasons, may make it attractive to use lightweight robotic air vehicle embodiments to avoid a potential of mud adhering to a wheeled vehicle, or a need to avoid or drive over irrigation pipes which may be installed in crop fields. However, typically greater wind velocities in Great Plains states and the upper Midwest, and typically dryer soil conditions, may favor use of robotic ground vehicle embodiments of weed control vehicles to avoid flight control issues associated with use of near-surface, lightweight, buoyant air vehicles in higher wind velocities.

Figure 2A:
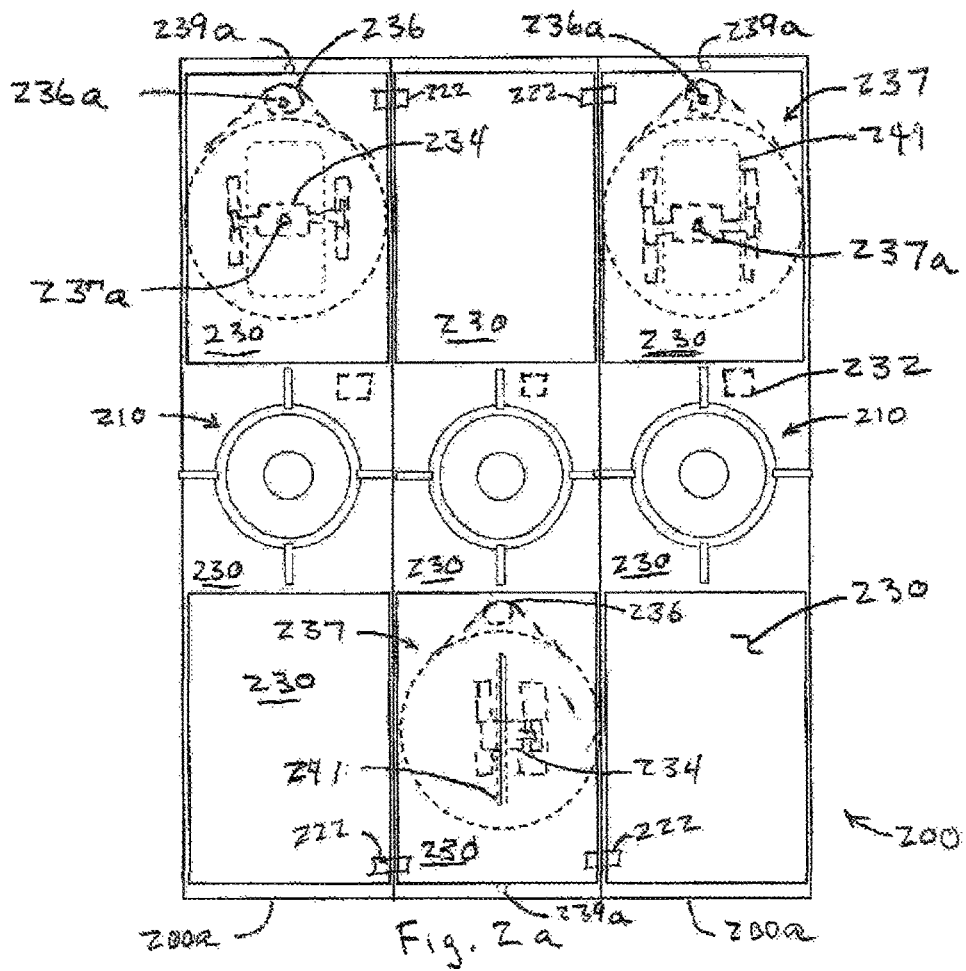
FIG. 2a is an illustration of an overhead view of solar concentrators mounted in a solar photovoltaic cell powered vehicle constructed of modules for easy expansion or reduction to size needed for a given application.
Figure 2B:
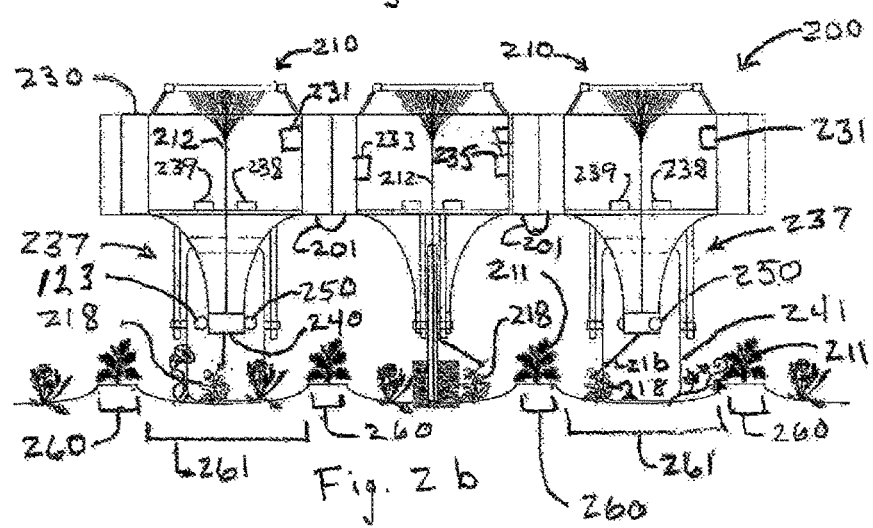
FIG. 2b is an illustration of a side-on view of an end of the ground vehicle of FIG. 2a showing representative placement of concentrated beam directors and wheels and other features of the instant invention.

In portions of the description which follow, where components of a ground vehicle and air vehicle are similar in structure and/or function, adjacent reference numbers are used, with a reference number applicable to an item in FIGS. 2*a* and 2*b* for a representative weed control ground vehicle generally preceding a reference number for an item in FIGS. 3*a* and 3*b* which illustrate a representative embodiment of a weed control air vehicle.

FIGS. 2*a* and 2*b* provide top down and front views, respectively, of a representative configuration of a robotic weed control ground vehicle 200 for implementing a weed control strategy involving use of concentrated solar energy to damage any exposed portions, or just selected portions, of weed plants 218 to kill such weed plants or stunt their growth. Much of a top surface of weed control vehicle 200 may be covered with solar photovoltaic panels or thin-film photovoltaic materials 230 for generation of electricity for electric propulsion and steering motors, control and sensor/processing electronics, actuators (e.g., for shutter control), servo motors (e.g., for beam pointing) and other needs. Optionally, some embodiments of weed control vehicles 200 may employ solar thermal collectors driving Stirling engines and electromechanical alternators or generators, or other solar-to-electric conversion methods and apparatus, to generate electric power for such needs. Some embodiments may employ solar-to-mechanical power conversion technologies for propulsion (e.g., using mechanical power for hydraulic pumps for hydraulic motors coupled to wheels for propulsion). Closed-cycle power generation methods and apparatus not requiring frequent replenishment of lost fluids such as water for steam are much preferred (e.g., where working fluids are retained and recycled). In some embodiments, larger weed control vehicles, units, or assemblies may be built-up or assembled as a collection of modules, which may be, for example, one-row, two-row, or three-row modules, which may be coupled together to provide an integrated unit or assembly many rows wide for larger field applications. Such assemblies offer possible savings in numbers of wheel trucks and other assets required, as noted later here, but a tradeoff must be made between overall width and size and a need to be able to avoid or navigate through or around potential obstacles, such as center pivot irrigation systems and other features or equipment that may be in a crop field or other application region, or to accommodate hilly terrain, ditches, or other features that may cause increased stress on larger vehicle assemblies. Smaller groupings or units may be more effective for smaller fields and other applications, and even smaller, single solar concentrator units may be desirable for applications such as weed control in residential lawns. Each module may have optional attachment points, or other means whereby wheel trucks 237 or, optionally, tracks and/or treads similar to those used on bulldozers but typically much smaller for weed control vehicle application, may be attached in different locations, so that more wheel trucks 237 per unit width may be used as needed for stability on smaller vehicle assemblies, as in FIGS. 2*a* and 2*b*, but where fewer wheel trucks 237 per unit width may be needed on larger multi-row combinations for larger fields, thereby potentially reducing costs. Each wheel truck assembly 237 may generally include its own electric (or, in some embodiments, hydraulic, pneumatic, steam driven, or other solar-power-driven) motor 234 for propulsion and may include a separate motor 236 and, optionally, one or more shaft position encoders 236*a*, 237*a* or other shaft angle measurement devices for steering. Steering may also be provided by other conventional and known mechanisms and actuators. Propulsion steering motors and actuators may be coupled to and be operated responsive to a vehicle navigation subsystem 239 which may make use of one or more position and/or direction reference systems, such as one or more global positioning system receivers or processed real-time video systems, and may also use stored knowledge of field limits and obstacles, to issue control signals to propulsion and steering motors and/or other actuators. For some deployments, a weed control vehicle may be provided with information related to rotation rate of a center pivot irrigation system, or other dynamic or schedule information related to locations of potential obstacles so that logic in navigation system 239 may be used to avoid such obstacles or effects therefrom (e.g., such as overspray from an irrigation system). Navigation system 239 may also be provided with other information on field conditions and employ logic that enables the system 239 to determine when portions of a field may be shaded by trees or other obstacles so that vehicle movement may be controlled to operate weed control vehicles 200, 300 in such regions when sunlight is available (e.g., in morning hours on a west side of a field having trees on its west side).

Some wheel truck assemblies 237 may use two wheels attached, for example, to an inverted "U" structure that can straddle a row (i.e., wheels spaced to roll in adjacent row middles) but which can pivot about a generally vertical axis. In such an assembly, each wheel may be driven by its own separate motor, or differential gearing or other means may be used to drive each wheel separately, so that steering inputs may be provided by driving one wheel on a truck at a slightly greater speed than the other, or by driving wheels in different rotational directions (e.g., one driven forward and the other driven in reverse) so as to cause the wheel truck assembly to rotate about its vertical axis. With this arrangement, when a multi-row wide weed control vehicle reaches an end of a set of rows being treated in a field, all wheel trucks may be turned 90 degrees by such differential drive of wheels, or by using a steering motor or other steering actuator in single wheel trucks, and then the entire integrated weed control vehicle assembly or unit may move sideways (i.e., along its greatest length dimension) a distance equal to its overall row width, so as to be positioned at an end of the next set of rows to be treated, then wheel trucks may be further turned another 90 degrees, or be turned back 90 degrees, or be otherwise realigned, to allow the integrated weed control vehicle assembly to move "in reverse" back down the next set of rows to be "treated." Motors used for propulsion and steering may be capable of operating in forward and reverse rotations and may be coupled to driven components (e.g., pulleys attached to or made a part of wheel hubs) via V-belts or serpentine belts, or by other conventional means, but preferably so that electric or other type motors may generally be mounted higher than wheels to permit operation across or through standing water in fields where necessary, and to reduce intake of dust or other debris in cooling air where needed. Optionally, motors sealed or otherwise capable of operating in water or other stressing environments may be used. Tires 241 may be of a "high floatation" type but made of a material (possibly including Teflon™, polyethylene, or other non-stick material) and structure (e.g., little or no tread depth) that resists adherence of mud or other substances that could increase power requirements for propulsion. Since little traction will be required, a tread design may be used that provides sufficient traction for generally lightweight weed control vehicles 200 but which does not encourage mud collection within tread features. For some applications, wheels and tires (or, in some embodiments, tracks) may have features which will permit weed control vehicle 200 to engage and roll over irrigation pipes and/or ditches without damage to pipes or the vehicle.

One or more Fresnel lenses, or arrays of Fresnel lenses, or other devices or assemblies, including reflectors, for solar energy collection and concentration may generally be provided as a solar concentration assembly 210 and dedicated for each row middle for row crops. For some embodiments, each Fresnel lens or array, or other solar concentration assembly 210, may be gimbaled so that it may be kept pointed toward the sun or maximum energy collection as weed control vehicle 200 moves and the sun moves overhead during each day. Solar pointing may be implemented in open-loop mode using conventional techniques typically involving knowledge of vehicle position (e.g., latitude, longitude, and attitude), which may be provided by multiple GPS antennas and GPS or differential GPS signals, or simply by a programmed input of a location of a center or other portion of a field) combined with calculations of solar position or direction, in azimuth and elevation, as viewed from a location of weed control vehicle, as a function of time of day, and use of servo-motors, gimbals, shaft-encoders, and/or other conventional means to position a solar concentration assembly 210 in azimuth and elevation so as to point a collection area or surface toward the sun for maximum or enhanced solar energy collection and/or concentration efficiency. In some embodiments, inclinometers, inertial navigation systems, magnetometers, multi-axis magnetic compasses, or other conventional components, may be used to provide information on vehicle tilt, or other attitude information, as an input to pointing calculations or controls provided to azimuth and elevation control mechanisms. Solar pointing may instead or also use closed loop tracking of sun position in azimuth and elevation using, for example, conventional methods to generate error signals (e.g., as from a quadrant detector) to drive servo motors or other alignment actuators to maximize or enhance received solar energy. Fresnel lens or lens array or other solar concentration assemblies or devices 210 may be coupled to one or more optical passageways for transmitting concentrated solar energy from above a crop to a beam director 240 nearer to the ground, such that in some applications beam director 240 may be located below a closed or closing crop canopy, particularly later in a growing season. Optimal height above ground of beam director 240 may be different for different weed growth stages and other considerations (e.g., whether to provide top down delivery of a weed control beam or to provide side-on delivery of solar energy to another susceptible part of a plant). It may be desirable in some embodiments to provide a mechanism for automatically or manually varying height of beam director 240 responsive to crop and weed conditions. Beam director 240 or other components of an optical train for concentrated solar energy may include an ability to focus a weed control beam 216 at a selected range in order to concentrate energy for maximum damage to a selected point on a weed plant 218 in minimum time, and to also allow weed control beam 216 to spread beyond a targeted point to reduce risks to portions of crop plants 211 that may be in the path of weed control beam 216, and to reduce risks of starting fires in dry vegetation or other combustible materials beyond a targeted point. A shutter or another mechanism will be needed for controlling amount of energy captured, concentrated, and delivered to a beam director. As in other embodiments described herein, a shutter or other intensity control mechanism or device may be as simple as a set of vanes, slats, or other long thin members similar to those used in Venetian blinds, or those used in signaling lights for signaling between ships, which may be actuated and turned to block light or permit passage of light. In some embodiments, a surface of slats, which may be used for intensity control, may be mirrored or have a generally specular reflective coating or surface, so that such slats may also be used in a solar tracking and solar energy directing capability, as described earlier herein. Other optional shutter mechanisms may include large iris rings such as used for shutters or f-stop setting in some cameras, use of long thin elastic membranes, similar to balloons, that may be attached to thin support members and alternately inflated or deflated using an electric air compressor and/or accumulator tank to control passage of sunlight. Other possible shutters may make use of short lengths of sun-shade material wrapped around multiple thin diameter spring-loaded shade rollers spaced at intervals and coupled together such that, with only a short actuation distance (e.g., 4 to 6 inches) multiple lengths of shade may be used to cover the aperture to prevent or reduce passage of sunlight. Other potential shutter mechanisms may make use of polarized light and liquid crystal or other electro-optic materials to provide a potentially more rapid means of control. Generally, it will be better to mount such a shutter assembly either just above or just below each Fresnel lens or lens array to provide control of beam intensity at a location in an optical path before beam energy is highly concentrated such that beam energy could damage intensity control slats or other intensity control mechanisms or devices.

As noted, in some embodiments, sensors 250 may be used to detect and target weed plants. Such sensors 250 may range from very simple to relatively complex sensors including image processing and/or machine vision capabilities. Where an initial growth rate after weed seeds germinate is sufficiently slow that a revisit interval of approximately 7 to 10 days will permit damaging of weed seedlings in an early stage of growth when they are particularly susceptible, it will generally be feasible to effectively kill all seedlings with brief applications of a weed control beam 216 (FIG. 2b) either on young leaves or on a young stem of a weed plant. Weed control beam 216 may be configured to provide a circular, linear, or other projected geometric cross-sectional shape of a weed control beam 216 comprising concentrated solar energy. Where essentially all weeds emerge from seeds and/or can be controlled when treated in an early stage of development, an effective weed control vehicle/system 200 (FIGS. 2a, 2b), 300 (FIGS. 3a, 3b) may require only a simple weed sensor 250 (e.g., one that can detect green weed leaves on brown or other non-green soils) for detecting weeds in earliest growth stage, especially where weed control vehicles 200, 300 are designed to operate in or over muddy fields so that a re-treatment schedule is not interrupted by periods of field inaccessibility due to muddy fields after rain or irrigation. If, however, weed growth is very fast, so that complex plants with multiple growing tips, tendrils, or other features are formed within periods of a week or so after germination or other emergence (e.g., as in rhizomes that propagate via roots), or if other operational conditions (e.g., multiple days of rainy or overcast conditions) or other concerns prevent a more frequent revisit interval, then a more complex sensor 250 or sensor suite and associated processing capability may be needed to obtain data and analyze images or other sensor data to identify weed plants and/or to identify selected portions of weed plants 218 to be targeted with weed control beam 216.

Thus, sensor 250 and other requirements for different embodiments of robotic weed control vehicles 200,300 are dependent upon growth rates of weeds to be controlled, supportable re-treatment intervals, and upon responses of weed plants to concentrated solar energy at different stages of development. Some of these considerations are addressed in the following examples. In an example for row crops, where a weed control strategy may include (1) beginning "treatments" with concentrated solar energy (a) soon after an initial cultivation is performed using conventional equipment to "turn under" any weeds or intentional ground cover vegetation that may have grown in a field prior to preparations for planting a crop, or (b) soon after an initial herbicide application is used to kill herbicide-susceptible weeds, then (2) performing frequent "re-treatments" using methods and apparatus of the instant invention to keep weeds killed or stunted prior to canopy closure. "Treatments" may include "treating" any plant not growing in a designated crop area (which may be defined, for example, as a two-inch wide strip down a top of each row, using, in some embodiments and applications, positions determined during planting and later at times of weed treatment by differential GPS or by other navigation or precision position reference means such as cameras 201, 301 looking down one or more rows or lines of crop plants 211, 311 and using image processing and averaging to estimate row top center positions (e.g., crop areas 260, 360) relative to vehicle 200, 300, sensor 250, 350, and weed control beam 216, 316 positions).

With re-treatment intervals short enough (e.g., every seven to ten days) to prevent growth of weeds beyond initial sprouts or initial leaf pair stage, then solar concentration optics may be used that produce a weed control beam 216, 316 comprising a line of intense, concentrated solar energy extending transversely across each row middle, and extending from a crop area 260, 360 on one row to a crop area 260, 360 on an adjacent row, so that no sensors 250, 350 are needed for weed detection for weeds in row middles 261, 361. However, for applications where weeds are sparse, but grow rapidly, embodiments may be used wherein solar energy is concentrated into a broad spot, e.g., one to two inches in diameter, and simple optical sensors 250, 350 such as inexpensive color cameras or two-band linear sensor arrays may be used to simply detect "green leaves" or "white shoots" growing in non-green soil outside designated crop areas 260, 360, which may be determined from a position reference interface with a vehicle navigation system 239, 339, and outputs from simple sensor 250, 350 may be used to steer a beam director 240, 340 so as to direct a weed control beam 216, 316 producing a spot of concentrated solar energy onto weed 218, 318 leaves as robotic vehicle 200, 300 passes slowly over weed 218, 318. For this example application, it is important that overall vehicle design, particularly for ground vehicles, support relatively inexpensive acquisition cost to a crop producer and inexpensive and reliable operation so that re-treatment intervals may be kept short and re-treatment opportunities (i.e., sunny days) are not missed due to equipment failure or non-availability.

In situations and applications, such as organic or natural farming, where an initial treatment with chemical herbicides is not permitted or desirable, and cultivation to turn weeds under is not practical, then mowing, bush-hogging, or similar measures may be needed to cut down tall weeds, followed by frequent treatments using a weed control beam 216, 316 which may have a projected cross-sectional shape approximating a line or highly elongated ellipse, such as may be produced by a cylindrical Fresnel lens, reflector, or similar optical element, to damage leaves and other portions of all remaining weeds. Due to potential shading of portions of weed leaves by other weed leaves in an application involving well established weeds, more frequent re-treatment intervals may be needed to provide desired effectiveness in controlling remaining weeds and preventing new growth of weeds from seed or from roots of previously established weeds.

Where operational conditions and other considerations may prevent re-treatment at intervals frequent enough to prevent weeds from growing beyond a seedling stage, and where it is necessary to control weeds growing within a designated "crop area" 260, 360 between or among crop plants 211, 311 in a top of a row, or in crops that are not grown as row crops, then it will desirable to have a more sophisticated sensor system that can differentiate between weed plants and crop plants, and which, in some embodiments, may also be able to resolve structure of a weed plant that has grown beyond an initial seedling stage so that selected portions of such plants may be identified and targeted for a selected effect (i.e., damaging growth terminals to keep a weed from growing beyond a selected height where it could otherwise interfere with harvesting of the crop). For such applications, more sophisticated sensors may be needed such as spectral sensors that are able to collect information at many, or a selected few, spectral lines and then support discrimination of plants to identify weeds or at least non-crop plants using known techniques such as comparing intensity ratios of selected spectral lines, or providing such intensity ratios to a neural network trained to recognize crop plants and/or selected weeds. Such sensors may also separately or additionally employ shape and/or pattern recognition algorithms to distinguish crop-plants 211, 311 from non-crop plants (e.g., weeds 218, 318). Where weed growth has progressed beyond initial seedling stage, additional sensor and processing capabilities such as stereo viewing, RF or laser scanning or RF or laser radar capable of imaging weed plants in three dimensions or providing other information on plant structure and geometry. RF sensors may be able to penetrate outer leaves and provide information on central stems and other structure useful for identification or targeting, and may use synthetic aperture radar or other known imaging techniques to support discrimination between crop and non-crop plants, or to support identification of desired targeting points on weed plants where maximum damage or other desired effect, such as preventing formation of seed, may be obtained for an available weed control beam intensity and dwell time. RF sensors may include x-band through mm-wave or higher frequencies.

Effective use of advanced sensor and processing technologies may require a more sophisticated vehicle movement control system and coupling between sensor subsystems and vehicle movement subsystems so that, for example, weed control vehicle 200, 300 may be made to pause while additional data is being collected and processed to categorize a plant and, if necessary, select and apply concentrated solar energy to one or more selected target points.

As noted, simple sensor systems may comprise a simple scanning color camera or two-band sensor, which may be implemented as a linear array, coupled and aligned with a beam director 240, 340 to detect and treat weed seedlings and sprouts only in row middles 261, 361 between selected crop growth areas 260, 360. Sensors 250, 350 for detecting more complex weed structures and identifying key target points for application of concentrated solar energy may comprise stereo viewing cameras coupled with image analysis processors and may be mounted on or near moving portions of beam director 240, 340, or principal or additional sensors and particularly processors may be located higher on weed control vehicles 200, 300 so as to be better protected from potential exposure to water and dust environments, and/or to provide viewing of weeds 218, 318 and crop plants 211, 311 from another aspect angle (e.g., from an almost overhead position from which shape of leaves may be better determined and applied in a pattern recognition algorithm or optical correlator used to distinguish crop plants 211, 311 from non-crop plants, which are normally weeds 218, 318). Preferred mounting positions or heights of sensors 250, 350 may change during a growing season for a particular crop, with a generally overhead viewing position being preferred during early stages of crop development, when an overhead viewing aspect may useful in differentiating weed plants 218, 318 from crop plants 211, 311 based on early leaf shapes of emerging plants, and a lower sensor height or viewing aspect being preferred later in a growing season, when leaves and other components of developing crop plants may begin to interfere with or prevent viewing of emerging weeds from an overhead viewing aspect, and when a crop canopy for some crops may be beginning to close. In some embodiments, due to shading from crop plants or from a weed control vehicle, it may also be desirable to provide a capability for an intensity control capability, such as use of intensity control slats 136 or other methods and apparatus for intensity control discussed earlier, to also provide a capability for illuminating an area in a field of view of a sensor with light provided via the same or a similar optical path as used for a weed control beam 216, 318, but at a lower intensity so as to be suitable for providing adequate illumination in shaded areas for sensor viewing or data collection, but below an intensity that would damage crop plants. Such a capability could be provided by an intermediate detent or range of positions for an intensity control subsystem, augmented by beam focusing or diverging capabilities of optics in a beam director 240, 340, or via other light output ports on a weed control vehicle 200, 300.

Optical sensors used in conjunction with or near a weed control beam 116, 216, 316 may also require shutters, f-stops, or other adaptive light transmission devices, perhaps similar to adaptive light transmission devices used in modern welding helmets for eye protection during welding, or PLZT (lead, lanthanum, zirconium titanate) devices used in military flash-blindness protection goggles used for protecting eyes of flight crew members from light produced by nuclear explosions, which can rapidly respond to a received light intensity and quickly adjust transmitted light to an acceptable level for protection of eyes, or of sensitive optical detectors, while allowing transmission of sufficient light for a wearer to see and perform his functions, or for a sensor to operate and support video and other data collection functions. Such a capability may be needed when concentrated solar energy is applied by a solar energy concentration and beam director system to a weed plant 118, 218, 318 within a sensor 123, 250, 350 field of view. In another embodiment, a mechanical or electrical interface may be provided between a beam intensity control mechanisms or system, and a sensor protection system, so that a sensor may be "stopped down" to a selected level for protection during periods when a weed control beam 116, 216, 316 is being operated at high intensity.

One factor to be considered in selecting different embodiments of the instant invention for different applications and weed control methods is the potential complexity of weed structures, such as additional branching to establish new growth tips or terminals, or new tendrils, that may result from damage to weed plants by application of concentrated solar energy. This potential complexity of weed structures has a bearing on the capabilities needed in a sensor suite for subsequent treatments, which may lead to different categories of weed control vehicles 200, 300, or different categories of sensor modules and sensor subsystems for such vehicles (simpler sensors for treatment of new emerged weeds and more sophisticated sensors for initial or subsequent treatments on weeds that have developed complex branching structures, either from natural development or as a result of a branching response from an earlier treatment with chemical herbicides or with concentrated solar energy). In one example application, weed control vehicles 200, which may be assembled of many modules to be many rows wide (e.g., 15 to 30 rows wide or more for large scale farm applications) may be used to move up and down rows and apply a "broadcast treatment" to weeds 218 growing in row middles 261 between crop areas 260. This treatment method may use generally linear beam patterns, as from "cylindrical" lens or other optics components, with one or more linear beam patterns projected transversely to each row middle 261 and moved by vehicle 200 down each respective row so as to subject any vegetation growing in row middles 261 to "broad" (in a cross-row-middle sense) weed control beams 216 having lethal or damaging intensities of concentrated solar radiation, while, in some embodiments and applications, also collecting information from sensors 250 to identify areas where weed plants 218 are located that will likely not be controlled adequately by a "broadcast" treatment. This information may be used, for example, together with associated position reference information, to generate weed maps, or to otherwise provide information that may be used to select areas in crop fields for additional weed control follow-up treatments, which may be made using the same vehicle 200 or one or more other robotic weed control vehicles 200, 300, which may be equipped with more sophisticated sensors, and which may be able to travel more rapidly to and between selected areas of a field, and identify and target selected portions of weed plants 218, 318 to provide additional weed control treatments and damage to weed plants as may be needed for weed plants 218, 318 not controlled with a broadcast treatment.

Design considerations for various embodiments of lightweight solar-propelled robotic weed control ground vehicles and robotic weed control air vehicles should include consideration of ranges of wind velocities that may be encountered in different crop growing regions and in different seasons within selected growing regions. Wind velocities in areas of intended operation for selected embodiments may lead to a need to insure robotic ground vehicles are sufficiently heavy and strong to withstand such forces, and/or have static or adaptive features, such as inverted air foils used on race cars, to maintain stability over a range of wind speeds and wind loads that may be encountered in a selected deployment area. Similarly, it may be necessary to insure robotic air vehicles have sufficient propulsive power to overcome expected wind forces in an intended deployment region up to some probability of occurrence of such wind speeds, but also provide a means of preventing a catastrophic loss of a robotic air vehicle, and/or a means of preventing a wind-blown robotic air vehicle from drifting into road traffic, power lines, or even air traffic. Such means may include emergency exhaust ports 351, screw-in ground anchors 352 (such as typically used for antenna guy wires), or other measures. A small electric motor 354, cable, and pulley may be used to lower and rotate each anchor 352 when necessary to "land" and stabilize vehicle 300 against winds or wind gusts that exceed its propulsive operating limits. Thrusters 334 may be reversed or inverted by thruster angle motors 334a to add a downward force when needed to help "set" and place anchors 352. After threatening winds or gusts have passed, anchor motors 354 may be reversed to unscrew anchors from soil and retract anchors to a stowed position for normal flight operations. A temporary or permanent wind gust monitoring system may be deployed downwind of areas where weed control air vehicles 300 are being used to provide a few minutes or seconds of advanced warning of gusts that may require such protective responses. A typical wind gust monitoring system may comprise an anemometer 382, a wind direction arrow or similar device 383 coupled to a potentiometer, shaft encoder, or similar shaft angle monitoring unit 385, and a wind speed and direction processor 384 coupled to a communications unit 386 for transmitting wind speed and gust information to weed control vehicles 200, 300 and/or to a farm control system or other location.

Electrical power required for operation of weed control vehicles 200, 300 will generally be provided by solar photovoltaic panels 230, 330 which may be coupled to a solar power conditioning unit 231, 331 which may recharge one or more batteries 232, 332 and/or provide power directly for propulsion and steering motors 234, 236, respectively, and thrusters 234 and thruster angle and attitude control motors 334a, 336, respectively, sensors 250, 350 and processing 238, 338 and navigation 239, 339 subsystems. One or more batteries 232, 332 or other energy storage devices may be needed to permit control and security functions to operate in "sleep" or other reduced modes during periods when sunlight is insufficient to support photovoltaic or other means for generation of electrical power to support normal operations, and also to permit overnight operation of optional security 233, 333 and communications 235, 335 subsystems. Vehicle subsystems may be integrated or coupled as needed to coordinate control of vehicle movement with imaging and processing and vehicle positioning and stability needs of the sensor subsystem 250, 350 or the beam control and beam director subsystem 240, 340. In applications where multiple individual or few-row modules 200a are combined to provide a many-row-wide vehicle, a control processor 238, 338 may be capable of receiving inputs from multiple position sensors (e.g., GPS antenna 239a, 339a and multi-channel GPS receivers in navigation subsystem 239, 339) and providing control signals to propulsion motors 234 or thrusters 334, steering motors 236, and thruster angle 334a and attitude control thruster motors 336 so as to keep various portions of a vehicle moving in a coordinated manner that does not cause undue stress in vehicle structural elements and interconnects 222. Vehicle structural elements may include conventional aluminum or other metallic components, such as structural tubing, but may also include lightweight, high strength elements and materials such as graphite composites and high strength fabrics or films or sheets where warranted, particularly for use in embodiments of weed control air vehicles. Communications between components located on different modules may be provided preferably by wireless (e.g., zigbee) or fiber-optic data links to minimize weight and structural complexity, and intra-vehicle communication links may be provided as may be needed to support transfer of information needed for position and attitude control, or to transfer data to a centrally located long distance wireless communications unit 235, 335 (e.g., to send position, vehicle health and status information, weed sensor data, security alarms, and other information). Stress sensors may be included in interconnects 222 to measure stress at selected interfaces in an interconnected multi-modular vehicle, or techniques involving use of alignment cables such as used in center pivot irrigation systems may also be used.

Use of a precision position reference system such as GPS or differential GPS coupled with pre-programmed knowledge of field boundaries and locations of obstacles in a field such as center-pivot irrigation systems, irrigation or drainage ditches, and the like provide a primary means of collision avoidance. However, in some embodiments, a backup collision avoidance subsystem may be provided by a collision avoidance line stretched around a periphery of weed control vehicle and connected to a spring-loaded micro-switch, where such line is stretched between support members, which themselves may be mounted on springs or other flexible support having integrated spring-loaded micro-switches, configured so that a micro-switch is switched from a normally open to a closed position, or vice-versa, if tension on collision avoidance line increases due to contact with an object, whereupon a micro-switch state change input to control system processor 238 causes processor 238 to stop motion of weed control vehicle 200 and send an alarm back to a central control facility for a farm, or to another location designated to receive such alarms. For such applications, a collision avoidance line may be stretched at a height which will be above an expected height of crop plants but sufficiently low that it is likely to encounter farm equipment, parts of center pivot irrigation systems, or other objects that may be in a field where robotic weed control vehicle 200 is operating. Alternatively, laser scanners and/or a laser radar, or a RF radar such as used to provide warning of objects in an intended path of a weed control vehicle so that control system processor 238 may be able to implement an appropriate response (e.g., stop, reverse, sound or send alarm). Stress sensors mounted on wheel trucks or other structural elements may also be used to provide warnings via signal inputs to processor 238 of unusual conditions which may be used to trigger a shutdown and alarm condition.

As noted, electric power for weed control vehicles 200, 300 may be provided by solar photovoltaic panels, which may be made using thin-film technologies. In some embodiments, thin-film solar photovoltaic panels may be applied directly to a thin sheet or film material selected to comprise an envelop for one or more chambers configured to contain a gas such as hydrogen or helium selected to provide buoyancy for a weed control air vehicle. For example, thin-film solar photovoltaic panels and strips are available from PowerFilm, Inc., Boone, Iowa (www.powerfilmsolar.com). A flattened torus of diameter of approximately 20 to 30 feet configured as shown in FIGS. 3a and 3b could provide over 1 kilowatt (kW) of electric power for propulsion and attitude control thrusters 334, 336 and 0.5 to 1 kW or more of concentrated solar radiation for weed control while also providing sufficient lift to support a solar concentration assembly 310 and beam director subsystem 340, which together may include, as an example, a Fresnel lens array, holographic optical element, or other solar concentrator, and light guide 312 (which may be, for example, an open optical path or an internally mirrored hollow tube or a bundle of hollow or conventional optical fibers, which may be made of quartz or another material capable of transmitting high intensity, broad spectrum solar radiation with little attenuation), a sensor 350 and beam director unit 340, GPS antennas and receivers or other navigation and position reference subsystem 239 components, control and processor 238 electronics, and electric thrusters 334, 336. Multiple robotic weed control air vehicle units 300 may be coupled in line to help overcome side winds.

Where multiple weed control vehicle units 200, 300 are combined and operated as a single vehicle, each module (e.g., 200a) will generally have its own solar photovoltaic cells or panels 230, 330 for generation of electric power, and a solar energy concentrator 210, 310, light guide 212, 312, sensors 250, 350, processor 238, 338, and beam director 240, 340.

Where multiple ground vehicle modules 200a are combined to build-up many row-wide integrated vehicles, a smaller number of wheel truck assemblies 237 per unit width will generally suffice, and an entire integrated vehicle may be controlled by a single control computer 238, which may include multiple processors, and may be backed up by a second computer. A single-wheel truck assembly 237 typically includes a propulsion motor 234, a steering motor 236, a wheel and tire assembly 241, and drive belts, pulleys, shaft encoders, and other conventional items. Two-wheel wheel truck assemblies typically straddle a row and have independent drive for each wheel as noted elsewhere herein. To provide operational flexibility in building up many-row-wide weed control vehicles, wheel truck assemblies may be designed for quick attachment or removal from structural "hard points" or other features in each module that support attachment of wheel trucks where needed on vehicle support frame. Such features may include slide-on support rails using conventional quick-disconnect connectors for electrical, mechanical, hydraulic, pneumatic or other connections.

Other embodiments may comprise multi-row-wide weed control air vehicle units 300 which may be configured in a shape somewhat like an inverted inflatable raft, wherein bags or tubes that may be inflated with hydrogen or helium surround a central "floor" or support section that may be covered with solar photovoltaic cells or film and be equipped to include multiple solar concentration units 310 separated by a distance which may be adjustable so as to be selected to match a distance between rows in a particular crop. Such multi-row units may have ends that may be "squared-off" or otherwise accommodate being joined together to permit many-row wide units to be assembled from individual single or multi-row units. Widths of tubes or other membranes for enclosing a buoyant gas 308 surrounding a central section may be made sufficiently wide to support an area of thin-film solar panel 330 sufficient to provide adequate electrical power for propulsion and other functions, and sufficiently deep in a vertical dimension to provide adequate volume to provide a selected amount of buoyancy. Thrusters 334, 336 may also be re-locatable to different attachment points to support such configurations. Landing gear or anchors 352 that may be automatically screwed into the soil and/or emergency vent valves 351 may be used to prevent loss of weed control air vehicle 300 due to gusts. Modern weather prediction and monitoring capabilities can help predict, and avoid operation in out-of-limit winds, and gust sensors can help avoid or trigger protective actions to prevent loss of control. For example, local farm-level upwind gust sensors 380 such as illustrated earlier herein may be used to detect and send a warning via a wireless communication link 386, 335 to weed control air vehicles 300 operating in a selected area so that such vehicles can implement protective measures.

Protective measures, as noted earlier, may include, for example, use of "screw-in-ground" landing gear 352, which may employ split-disk or spiral bits such as used to anchor guy wires for antennas or power line poles. Such anchors may be made of aluminum or another lightweight metal or composite material that may easily be driven into the ground in a crop field by electrical motors 354 which in some embodiments may be connected via lightweight belts to lightweight pulley wheels coupled to shafts of such anchors. Some embodiments may employ downward thrusting onto support legs or "landing gear" 352a for use in gust prone areas. Other embodiments may have emergency release vents 351 for buoyant gas so that vehicle buoyancy may be quickly reduced for a controlled in-field easily recoverable controlled "crash" rather than risk uncontrolled movement of an air vehicle, possibly being blown into road traffic or into power lines, by wind gusts that exceed its propulsive capability.

Ground or air vehicle embodiments 200, 300 may use gimbaled or non-gimbaled Fesnel lens or other solar-concentration devices, which may be coupled to fiber optics, internally mirrored tubes, or use other means of collecting, controlling, and delivering solar energy where desired on targeted weed plants. Some embodiments may use a shutter or intensity control system such as described earlier for a backpack embodiment so that potential damage from a concentrated solar beam on non-targeted objects may be avoided. Such intensity control device may be a shutter or rotating slats similar to slats 136 described earlier. Slats may also incorporate mirrored surfaces as noted earlier and be mounted in a rotating frame so as to double as sunlight steering mirrors to accommodate movement of the sun and still provide control for angle of incidence of sunlight onto solar concentration devices such as Fresnel lens, holographic optical elements, or other devices. In some embodiments, control of light intensity may be implemented using a type of electromechanical shutter or photo-electric shutter, such as noted earlier herein, integrated in the optical path just below or above the Fresnel lens so that the shutter material is not exposed to concentrated solar energy. Maintaining directional control of sunlight being concentrated and delivered into optical fibers or hollow light guides is important for avoiding or minimizing losses associated with coupling solar energy arriving "off-axis" relative to a central optical axis of a solar concentration assembly (e.g., 148, FIG. 1e) into fibers or other optical guides. Maintaining directional control of sunlight may also be important in providing an ability of optics in beam directors 240, 340 to focus solar energy to a spot size or shape commensurate with a weed damage strategy.

As noted earlier, sensor and other requirements and capabilities for different embodiments of weed control vehicles vary as a function of weed control strategies. Capabilities of optical, spectral, stereo viewing, and RF and ladar sensors and associated processing which may be need in different weed control vehicle embodiments and applications are related to weed plant structural evaluation and targeting requirements for selected weed control strategies. Some embodiments may include a capability for "weed maps" designating where weeds are that may not be controlled by "broad brush" or "broadcast" treatment and which may need stronger, specialized treatment with "rapid response" or more specialized weed control vehicle.

For some applications, assemblies used in weed control vehicles 200, 300 to directly or indirectly focus concentrated rays of solar energy onto weed plants may be replaced by solar collectors which heat air forced by a fan and routed through pipes exposed to concentrated solar energy, with heated air emerging from a tube being directed by actuators to weed plants detected by sensors or simply in row middles or other non-crop-area locations.

In some embodiments, an alternative weed control mechanism such as application of electrical voltage and current via probes or spring electrodes directed toward weeds or simply dragged down row middles to provide a backup weed damage mechanism for optional use cloudy days when direct solar energy is not available for concentration via solar concentration devices described herein, but when solar energy penetrating and scattered from clouds is sufficient to permit generation of electrical power from solar photovoltaic panels. Such electric power may then be used for propulsion and causing weed damage in a reduced operational mode when direct sunlight is not available. In some embodiments, electric power may be used to operate mechanical weed damage devices and mechanisms such as rotary or sickle-bar mowers or shears, which may be operated in non-crop areas (e.g., row middles) without use of sensors or which may be operated by actuators responsive to sensors that detect and/or identify weed plants or targeted portions thereof.

Figure 4:
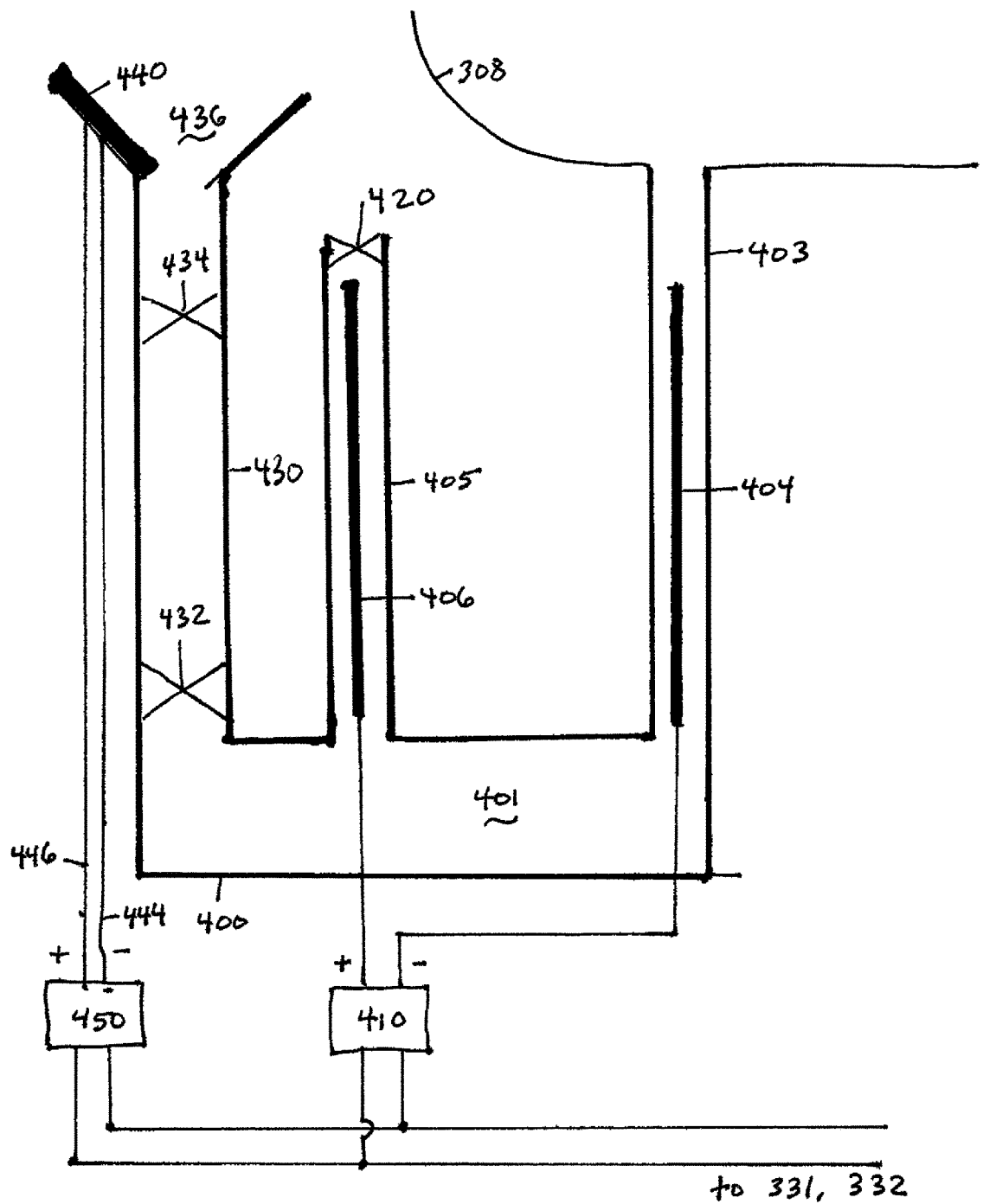
FIG. 4 is a schematic illustration of an assembly and controls for condensing and capturing water from humid air and using electrolysis of such captured water to replenish hydrogen gas in a container.

To reduce operating costs and enhance autonomous operation of lighter-than-air weed control vehicle 300, it may be desirable in some embodiments to utilize hydrogen as a lifting gas, rather than helium. An apparatus and method of generating hydrogen gas by the collection of water from humid air and disassociation of collected water into gaseous hydrogen and oxygen by means of an electrical current is shown in FIG. 4 and described below.

A container 400, which may be multi-chambered, holds a mixture 401 of water and an electrolyte, such as sulfuric acid, in which two conductive electrodes 404 and 406 are immersed within sections 403 and 405 of the container. A low-voltage electrical current originating at a source of potential 410 is injected into the electrodes with the negative terminal connected to the cathode 404, and the positive potential connected to the anode 406. The electrical power source for the source of potential may be a power conditioning unit 331 being fed by solar photovoltaic panels 330 or battery 332.

When the low-voltage potential is applied to the anode and cathode of the electrolytic cell 400, positively charged hydronium ions (a water molecule with an additional proton attached) are attracted to the negatively-charged cathode, liberating Hydrogen gas. Conversely, negatively-charged hydroxyl radicals (a water molecule missing a proton) are attracted to the positively-charged anode, liberating Oxygen gas.

Since the ratio of Hydrogen atoms to Oxygen atoms in water is 2:1, and both Hydrogen and Oxygen gas are formed of diatomic molecules, there will be twice as much (by volume) of Hydrogen as Oxygen generated within the cell 400. The Oxygen gas pressure relief valve 420 at the top of section 405 can be used to control the pressure of hydrogen gas within the lifting envelope of weed control vehicle 300.

The water fill-tube 430 is equipped with two valves 432 and 434 situated below chamber 436 which is open to atmospheric pressure. The operational sequence of these valves is as follows: "Close 432 Open 434 Introduce water into Chamber 436 Close 434 Open 432" which ensures that pressure will not "bleed off" as replacement water is introduced into container 400.

The height and volume of fill tube 430 is chosen such that electrolyte does not enter into the lifting chamber of weed control vehicle 300 at any time.

The voltage generated by the source of potential 410 is typically a time-varying DC waveform chosen to minimize polarization of the electrodes and whose voltage and waveform depend on the composition of the conductive electrodes.

For convenience, a Peltier cold-plate cooling module 440 may be mounted with the cold surface mounted in the inside surface of chamber 436. This permits the condensation of atmospheric moisture within the chamber to reduce the need to add replacement water while the weed-control vehicle is operating in the field.

The Peltier cold-plate is powered by low-voltage direct current generated by controller 450 and supplied by conductors 444 and 446 to module 440. The controller is powered by battery 332, or by power conditioning unit 331 which is fed by solar photovoltaic panels 330. The controller calculates the cold surface temperature required to condense moisture under the current atmospheric conditions. When the reserve chamber 436 has been filled, as may be determined by float switch, acoustic frequencies, or other conventional technique, the controller turns off the power to the cold-plate.

Figure 5A:
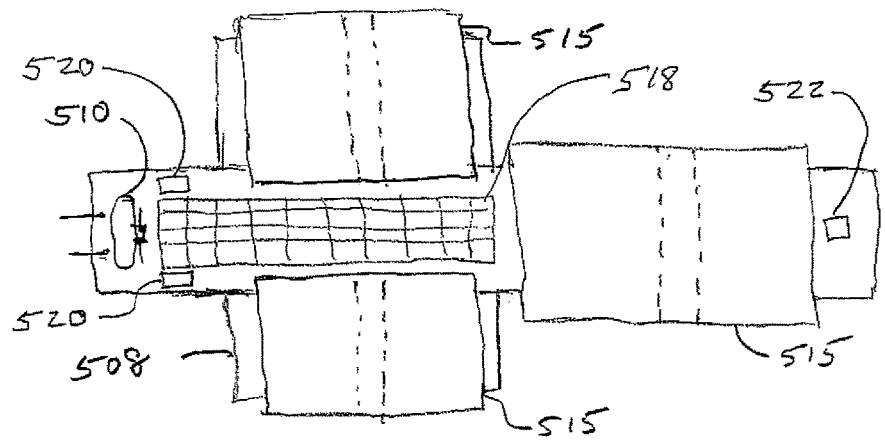
FIG. 5a is an illustration of a top-down view of solar concentrators mounted on a boat for control of aquatic weeds.
Figure 5B:
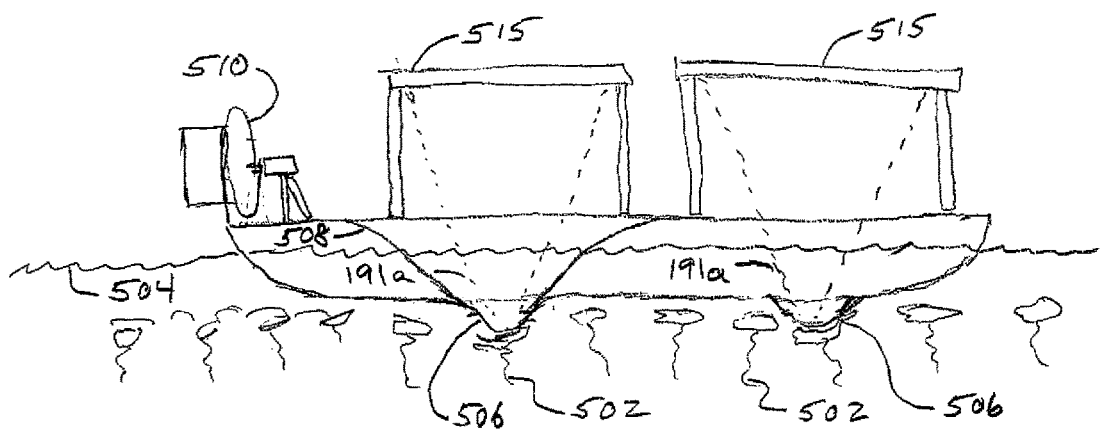
FIG. 5b is an illustration of a side-on view of the boat of FIG. 5a showing how water interface windows may be used to concentrate solar energy on submarine weeds.

FIGS. 5a and 5b illustrate an example embodiment of the instant invention for using concentrated solar energy to control aquatic weeds. Weed plants (502, FIG. 5b) frequently grow in ponds, lakes, swamps, and other aquatic environments. Frequently, chemical herbicides are ineffective against such weeds, perhaps partly due to dilution of chemicals in water which may be in a thin layer above a leaf in addition to surrounding a leaf on sides and bottom. Attempts to damage weed plants using a source of flame are generally ineffective for controlling aquatic weeds 502 such as Giant Salvinia that frequently float with leaf surfaces just below the water surface 504 (FIG. 5b) since a layer of water on top of weed leaves can act as a shield against hot gases and convective heating from a torch, and energy radiating from a flame of a conventional torch is generally insufficient to penetrate a layer of water and cause significant harm to a weed plant. However, concentrated solar energy 191a (FIG. 5b), which may be concentrated by Fresnel lens 515 or by reflectors or other conventional methods, including those disclosed earlier herein, will generally be capable of propagating through a thin layer of water, say 0.25 inches up to 0.5 inches or more with little attenuation of radiation so as to impinge upon and deliver significant energy to leaves or other portions of weeds 502 by absorption of such radiation. Such radiation, when concentrated from a sufficiently large concentrator (e.g., typically one square meter or more) will generally be capable of heating the leaf surface and internal structures sufficiently to cause rupture of cell walls or other significant damage, thereby killing or significantly stunting growth of the weed plant. As in embodiments described earlier, sensors may be used to guide highly concentrated and focused or collimated solar energy to selected portions of weed plant structures to obtain a desired control effect, or broader beams or lines of concentrated solar energy capable of heating exposed leaves and other structures to temperatures sufficient to cause significant damage may be used. In some applications and embodiments, it may be desirable to spray or otherwise apply a fluid that provides, in effect, an anti-reflection coating so as to enhance propagation of concentrated solar energy through an air-to-water interface. In other embodiments, dishes or cylindrical shapes or other windows or panels, hereinafter collectively referred to as "windows" (506, FIG. 5b) made of glass, quartz, or other material selected to provide high transmissivity of desired portions of a spectrum of concentrated solar energy, and which may also use anti-reflection coatings, may be used at locations (e.g., inboard, as in a "glass-bottom" boat, or outboard, as in an "outrigger" structure 508, FIG. 5b) where spot beams or lines of concentrated solar energy 191a enter a water surface to provide an enhanced transmission of solar energy into water, to reduce light scattering and reflection effects of ripples and small waves in water, and to also, in some applications, reduce distance concentrated solar energy will have to travel in water before impinging on a leaf or other portion of a weed plant. This reduction of light path distance may be particularly useful when operating in muddy or cloudy water. In other embodiments, additional lens may be used in the optical path to provide a degree of collimation of concentrated solar energy as described earlier herein before such concentrated solar energy is directed upon window 506.

Solar collectors, and in some embodiments, light guides and beam directors to collect and deliver concentrated solar energy to aquatic weeds, may be similar to embodiments disclosed in FIGS. 2a and 2b, and in FIGS. 3a and 3b, and in descriptions thereof.

High floatation wheels equipped with tread extensions that create an effect similar to a "paddle wheel," such as used on steamboats of years past, may be used to provide locomotion and traction across dense weed concentrations in water. In less dense concentrations, water propellers may be used, or thrusters, or air propellers 510, such as used on swamp air boats, may be used. Propulsion devices may be powered by electric power or by conventional methods. Power for electric propulsion may be provided by solar photovoltaic cell arrays 518, which may be coupled to batteries 520 for energy storage. For many applications, a Fresnel lens 515 or other solar collectors, including especially cylindrical lens that produce a line of concentrated solar energy that may be moved slowly over weeds in a lake or other body of water, may be used. Guidance may be similar to that described earlier using global positioning system satellite receivers 522 or other known precision position reference and guidance means, including following a laser beam. For some applications, a guide line or cable may be extended across a body of water, and a watercraft drawn back and forth by other cables may be used, or a watercraft or other weed control vehicle may provide its own means of propulsion using solar generated electric or mechanical power (as from a Stirling engine), or using a convention engine and conventional fuel.

For many applications, trolling motors such as used on bass boats and the like may provide appropriate speed and maneuverability for use in moving watercraft for controlling weeds in bodies of water. In some embodiments, such motors may be operated directly from solar energy or from batteries recharged by electricity produced by solar photovoltaic cells.

The invention claimed is:
1. A system for at least damaging weeds or unwanted plants comprising:
   a plurality of solar modules configured to be connected together to form an interconnected solar photovoltaic cell powered vehicle hereinafter referred to as "solar vehicle", with a number of said plurality of solar modules making up said solar vehicle selected considering at least characteristics of a crop field said solar vehicle is to traverse, said plurality of solar modules being operatively connected together so that said solar vehicle is moved in a coordinated manner, each said solar module of said plurality of solar modules further comprising, an upper surface extending over a length and breadth of said solar module, a solar energy collection and concentration device on said upper surface of said solar module, said solar energy collection and concentration device sized to collect a sufficient amount of solar energy to damage or destroy said weeds or unwanted plants, said solar energy collection and concentration device configured to concentrate collected said solar energy and emit collected and concentrated solar energy as a solar beam of an intensity sufficient to damage or destroy said weeds or unwanted plants, selectively controllable solar energy control apparatus mounted at said solar energy collection and concentration device, said selectively controllable solar energy control apparatus configured to be normally closed during daylight hours to block said solar energy and selectively opened for brief periods of time to pass a sufficient amount of collected said solar energy to at least damage targeted said weeds or unwanted plants, an optical beam director for receiving said solar beam and directing said solar beam to said weeds or unwanted plants, a remainder of said upper surface of said solar module comprising solar photovoltaic cells, for generating electrical power for powering said solar vehicle, a plurality of means for transporting said solar vehicle, one or each of said plurality of means for transporting said solar vehicle powered by said electrical power and attachable to respective selected ones of said plurality of solar modules, for transporting said solar vehicle in said coordinated manner across said crop field where said weeds or unwanted plants are growing.

2. A system as set forth in claim 1 wherein said means for transporting further comprises:

a plurality of driven wheel truck assemblies powered by said electrical power from said photovoltaic cells, one of each of said plurality of driven wheel truck assemblies attached to respective said selected ones of said plurality of solar modules, for supportably moving said solar vehicle, a control system comprising a data link coupled to said control system and each said wheel truck assembly, for steering and driving each wheel truck assembly of said plurality of wheel truck assemblies in said coordinated manner, said control system further comprising a precision position reference system coupled to said data link, for moving said solar vehicle responsive to signals from said precision position reference system over said crop field where said weeds or unwanted plants are growing.

3. A system as set forth in claim 1 wherein said solar energy collection and concentration device further comprises one or more Fresnel lenses.

4. A system as set forth in claim 3 wherein said one or more Fresnel lenses is sized to collect 1-2 kilowatts of said solar energy, and concentrate said 1-2 kilowatts of said solar energy into said solar beam, said solar beam sized between from about 0.25 inches in diameter to 6 inches in diameter in order to heat said targeted weeds or unwanted plants to a temperature sufficient to damage or destroy said weeds or unwanted plants.

5. A system as set forth in claim 1 wherein said solar energy collection and concentration device further comprises one or more light guides each having an upper end oriented to receive said collected and concentrated solar energy to be directed to said weeds or unwanted plants.

6. A system as set forth in claim 5 further comprising at least one solar concentrator mounted between upper ends of said one or more light guides and a source of said solar energy.

7. A system as set forth in claim 5 further comprising a plurality of solar concentrators, one of each said solar concentrators for one of each said upper end of a respective light guide of said one or more light guides, said one of each solar concentrators each concentrating said solar energy into said upper end of said respective light guide.

8. A system as set forth in claim 1 wherein said selectively controllable solar energy control apparatus is mounted immediately above said solar energy collection and concentration device.

9. A system as set forth in claim 8 wherein said selectively controllable solar energy control apparatus further comprises at least one selectively controllable normally closed light shutter, for blocking said solar energy during said daylight hours, said selectively controllable normally closed light shutter being selectively openable to pass said solar energy to damage or destroy said weeds or unwanted plants.

10. A system as set forth in claim 9 wherein said selectively controllable normally closed light shutter further comprises a plurality of normally closed slats that block said solar energy from said solar energy collection and concentration device during said daylight hours, said normally closed slats being selectively openable to pass said solar energy to damage or destroy said weeds or unwanted plants.

11. A system as set forth in claim 10 wherein at least one side of said plurality of selectively controllable normally closed slats is mirrored to direct said solar energy onto said solar energy collection and concentration device, and including angular positioning apparatus for angularly positioning said selectively controllable normally closed slats at a predetermined angle to direct said solar energy into said solar energy collection and concentration device when said plurality of selectively controllable normally closed slats are opened to damage or destroy said weeds or unwanted plants.

12. A system as set forth in claim 1 wherein said selectively controllable solar energy control apparatus is mounted immediately below said solar energy collection and concentration device.

13. A system as set forth in claim 1 further comprising tilting apparatus for tilting said solar energy collection and concentration device toward a source of said solar energy to provide a maximum of said solar energy to said solar energy collection and concentration device.

14. A system as set forth in claim 1 further comprising a non-contact infrared detector for measuring surface temperature of said weeds or unwanted plants being irradiated by said collected and concentrated solar energy, said non-contact infrared detector providing a signal when a predetermined surface temperature of said weeds or unwanted plants is reached or exceeded.

15. A system as set forth in claim 5 further comprising an optical unit mounted near a lower end of said one or more light guides, said optical unit further focussing and directing said collected and concentrated solar energy passed by said one or more light guides.

16. A system as set forth in claim 15 wherein said optical unit further comprises at least one mirror oriented to direct said solar beam onto said weeds or unwanted plants.

17. A system as set forth in claim 14 wherein said selectively controllable solar energy control apparatus is selectively opened to allow said solar beam to irradiate said weeds or unwanted plants for a period of time until said predetermined surface temperature is reached, as indicated by said signal.

18. A system for at least damaging weeds or unwanted plants comprising:
- a plurality of solar modules configured to be coupled together to form a multi-module vehicle, with a number of said plurality of solar modules making up said multi-module vehicle selected considering at least characteristics of a crop field said multi-module vehicle is to traverse,
- said plurality of solar modules operatively connected together so that said plurality of solar modules cooperatively move said multi-module vehicle in a coordinated manner, each said solar module of said plurality of solar modules further comprising,
  - an upper surface extending over a length and breadth of said solar module,
  - a solar energy collection and concentration device on said upper surface of said solar module, said solar energy collection and concentration device sized to collect a sufficient amount of solar energy to damage or destroy said weeds or unwanted plants, said solar energy collection and concentration device configured to concentrate collected said solar energy and emit collected and concentrated solar energy as a solar beam of an intensity sufficient to damage or destroy said weeds or unwanted plants,
  - selectively controllable solar energy control apparatus mounted at said solar energy collection and concentration device, said selectively controllable solar energy control apparatus configured to be normally closed during daylight hours to block said solar energy and selectively opened for brief periods of time to pass a sufficient amount of collected said solar energy to at least damage targeted said weeds or unwanted plants,
  - an optical beam director for receiving said solar beam and directing said solar beam to said weeds or unwanted plants,
  - a remainder of said upper surface of said solar module comprising photovoltaic cells, for generating electrical power, for powering said multi-module vehicle,
- a plurality of wheel truck assemblies powered by said electrical power from said photovoltaic cells, one of each of said plurality of wheel truck assemblies attached to respective selected ones of said plurality of solar modules, for supportably moving said multi-module vehicle,
- a control system for steering and driving each wheel truck assembly of said plurality of wheel truck assemblies, for maneuvering said multi-module vehicle responsive to a precision position reference system over said crop field where said weeds or unwanted plants are growing.

19. A system as set forth in claim 18 wherein said selectively controllable solar energy control apparatus further comprises a plurality of normally closed slats that block said solar energy from said solar energy collection and concentration device during daylight hours, said normally closed slats being selectively openable to pass said solar energy to damage or destroy said weeds or unwanted plants.

* * * * *